(12) United States Patent
Kuchka et al.

(10) Patent No.: US 11,568,008 B2
(45) Date of Patent: Jan. 31, 2023

(54) APPARATUS, METHOD AND ARTICLE TO IDENTIFY DISCREPANCIES BETWEEN CLIENTS AND IN RESPONSE PROMPT CLIENTS IN A NETWORKED ENVIRONMENT

(71) Applicant: PLENTYOFFISH MEDIA ULC, Vancouver (CA)

(72) Inventors: Steven Kuchka, Port Coquitlam (CA); Eric MacKinnon, Vancouver (CA); Steve Oldridge, Vancouver (CA)

(73) Assignee: PLENTYOFFISH MEDIA ULC, Vancouver (CA)

( * ) Notice: Subject to any disclaimer, the term of this patent is extended or adjusted under 35 U.S.C. 154(b) by 72 days.

(21) Appl. No.: 16/663,230

(22) Filed: Oct. 24, 2019

(65) Prior Publication Data
US 2020/0233854 A1 Jul. 23, 2020

Related U.S. Application Data

(63) Continuation of application No. 14/204,939, filed on Mar. 11, 2014, now abandoned.

(60) Provisional application No. 61/780,391, filed on Mar. 13, 2013.

(51) Int. Cl.
*G06F 16/9535* (2019.01)
*G06Q 50/00* (2012.01)
(Continued)

(52) U.S. Cl.
CPC ...... *G06F 16/9535* (2019.01); *G06F 16/2365* (2019.01); *G06Q 50/01* (2013.01); *G06F 16/3326* (2019.01)

(58) Field of Classification Search
CPC .. G06F 16/2365; G06F 16/9535; G06Q 50/01
See application file for complete search history.

(56) References Cited

U.S. PATENT DOCUMENTS

| 5,583,763 A | 12/1996 | Atcheson et al. |
| 5,724,521 A | 3/1998 | Dedrick |

(Continued)

FOREIGN PATENT DOCUMENTS

WO  2008/030670 A1  3/2018

OTHER PUBLICATIONS

Alsaleh, "Improving Matching . . . " Computer Sci Discipline 313-320, 2011.

(Continued)

*Primary Examiner* — Ashish Thomas
*Assistant Examiner* — Jedidiah P Ferrer
(74) *Attorney, Agent, or Firm* — Seed Intellectual Property Law Group LLP

(57) ABSTRACT

Information related to apparently successful end users is collected, stored, and used to generate at least one evaluation criteria to compare to at least one component of a respective end user desiring to become a successful end user. The information may be generated based on comparative information with other entities who appear to share some components with the respective end user. The components may be based on actual actions, preferences, constraints, attributes, etc. A number of components of the respective end user are compared relative to a set of defined evaluation criteria that specifies defined evaluation criteria for at least some of those components. In response to detecting at least one discrepancy, a prompt is provided to the respective end user indicative of the discrepancy.

21 Claims, 17 Drawing Sheets

(51) Int. Cl.
*G06F 16/332* (2019.01)
*G06F 16/23* (2019.01)

(56) References Cited

U.S. PATENT DOCUMENTS

| | | | |
|---|---|---|---|
| 5,749,091 A | 5/1998 | Ishida et al. |
| 5,812,992 A | 9/1998 | de Vries |
| 5,963,951 A | 10/1999 | Collins |
| 6,006,225 A | 12/1999 | Bowman et al. |
| 6,018,738 A | 1/2000 | Breese et al. |
| 6,029,195 A | 2/2000 | Herz |
| 6,038,295 A | 3/2000 | Mattes |
| 6,041,311 A | 3/2000 | Chislenko et al. |
| 6,049,777 A | 4/2000 | Sheena et al. |
| 6,058,367 A | 5/2000 | Sutcliffe et al. |
| 6,061,681 A | 5/2000 | Collins |
| 6,064,980 A | 5/2000 | Jacobi et al. |
| 6,134,532 A | 10/2000 | Lazarus et al. |
| 6,169,986 B1 | 1/2001 | Bowman et al. |
| 6,199,067 B1 | 3/2001 | Geller |
| 6,266,649 B1 | 7/2001 | Linden et al. |
| 6,356,879 B2 | 3/2002 | Aggerwal et al. |
| 6,542,749 B2 | 4/2003 | Tanaka et al. |
| 6,681,232 B1 | 1/2004 | Sistanizadeh et al. |
| 6,735,568 B1 | 5/2004 | Buckwalter et al. |
| 6,772,150 B1 | 8/2004 | Whitman et al. |
| 6,782,370 B1 | 8/2004 | Stack |
| 6,783,065 B2 | 8/2004 | Spitz et al. |
| 6,853,982 B2 | 2/2005 | Smith et al. |
| 6,912,505 B2 | 6/2005 | Linden et al. |
| 7,113,917 B2 | 9/2006 | Jacobi et al. |
| 7,240,353 B2 | 7/2007 | Lan et al. |
| 7,313,536 B2 | 12/2007 | Westphal |
| 7,324,998 B2 | 1/2008 | Beres et al. |
| 7,562,814 B1 | 7/2009 | Shao et al. |
| 7,617,164 B2 | 11/2009 | Burges et al. |
| 7,873,695 B2 | 1/2011 | Clegg et al. |
| 8,122,142 B1 | 2/2012 | Svendsen et al. |
| 8,180,765 B2 | 5/2012 | Nicolov |
| 8,225,413 B1 | 7/2012 | De et al. |
| 8,499,247 B2 | 7/2013 | Niyogi et al. |
| 8,566,938 B1 | 10/2013 | Prakash et al. |
| 8,577,874 B2 | 11/2013 | Svendsen et al. |
| 8,620,790 B2 | 12/2013 | Priebatsch |
| 8,626,663 B2 | 1/2014 | Nightengale et al. |
| 8,712,943 B1 | 4/2014 | Kim |
| 8,775,284 B1 | 7/2014 | Crook et al. |
| 8,825,802 B2 | 9/2014 | Pearce |
| 8,930,398 B1 | 1/2015 | Kishore et al. |
| 8,943,047 B1 | 1/2015 | Carpio et al. |
| 9,047,611 B2 | 6/2015 | Krishnamoorthy et al. |
| 9,069,945 B2 | 6/2015 | Singh |
| 9,076,125 B2 | 7/2015 | Manolescu et al. |
| 9,160,742 B1 | 10/2015 | Ackerman et al. |
| 9,218,468 B1 | 12/2015 | Rappaport |
| 9,219,704 B2 | 12/2015 | Hamlin et al. |
| 9,536,221 B2 | 1/2017 | Frind |
| 9,537,706 B2 | 1/2017 | Frind et al. |
| 9,537,814 B2 | 1/2017 | Rubinstein et al. |
| 9,672,289 B1 | 6/2017 | Frind et al. |
| 9,679,259 B1 | 6/2017 | Frind et al. |
| 9,733,811 B2 | 8/2017 | Rad et al. |
| 9,830,669 B1 | 11/2017 | Frind |
| 9,836,533 B1 | 12/2017 | Levi et al. |
| 9,870,465 B1 | 1/2018 | Levi et al. |
| 10,108,968 B1 | 10/2018 | Tekle et al. |
| 2002/0091972 A1 | 7/2002 | Harris et al. |
| 2002/0095303 A1 | 7/2002 | Asayama et al. |
| 2002/0103625 A1* | 8/2002 | Card .................. G06F 3/013 715/700 |
| 2002/0156632 A1 | 10/2002 | Haynes et al. |
| 2002/0184080 A1 | 12/2002 | Murad et al. |
| 2003/0014491 A1 | 1/2003 | Horvitz et al. |
| 2003/0065632 A1 | 4/2003 | Hubey |
| 2003/0065635 A1 | 4/2003 | Sahami et al. |
| 2003/0093405 A1 | 5/2003 | Mayer |
| 2003/0176931 A1 | 9/2003 | Pednault et al. |
| 2003/0234519 A1 | 12/2003 | Farmer |
| 2004/0012638 A1 | 1/2004 | Donnelli et al. |
| 2004/0107283 A1 | 6/2004 | Paddon |
| 2004/0210640 A1 | 10/2004 | Chadwick et al. |
| 2004/0230527 A1 | 11/2004 | Hansen et al. |
| 2004/0260781 A1 | 12/2004 | Shostack et al. |
| 2005/0003799 A1 | 1/2005 | Kang |
| 2005/0027707 A1 | 2/2005 | Syed |
| 2005/0080857 A1 | 4/2005 | Kirsch et al. |
| 2005/0108227 A1 | 5/2005 | Russell-Falla et al. |
| 2005/0108344 A1 | 5/2005 | Tafoya et al. |
| 2005/0223020 A1 | 10/2005 | Cutlip et al. |
| 2005/0240608 A1 | 10/2005 | Jones et al. |
| 2006/0018522 A1 | 1/2006 | Sunzeri et al. |
| 2006/0059142 A1 | 3/2006 | Zvinyatskovsky et al. |
| 2006/0059159 A1 | 3/2006 | Truong et al. |
| 2006/0149766 A1 | 7/2006 | Ghoting et al. |
| 2006/0206574 A1 | 9/2006 | Bellegarda et al. |
| 2006/0251339 A1 | 11/2006 | Gokturk et al. |
| 2006/0256959 A1 | 11/2006 | Hymes |
| 2007/0005587 A1 | 1/2007 | Johnson et al. |
| 2007/0061334 A1 | 3/2007 | Ramer et al. |
| 2007/0106659 A1 | 5/2007 | Lu et al. |
| 2007/0112792 A1 | 5/2007 | Majumder |
| 2007/0129999 A1 | 6/2007 | Zhou |
| 2007/0156664 A1 | 7/2007 | Norton et al. |
| 2007/0189272 A1 | 8/2007 | Hutchinson et al. |
| 2007/0206917 A1 | 9/2007 | Ono et al. |
| 2007/0233603 A1 | 10/2007 | Schmidgall et al. |
| 2007/0253031 A1 | 11/2007 | Fan |
| 2007/0265962 A1 | 11/2007 | Bowe, Jr. et al. |
| 2007/0282621 A1 | 12/2007 | Altman et al. |
| 2008/0039121 A1 | 2/2008 | Muller et al. |
| 2008/0086534 A1 | 4/2008 | Bardak et al. |
| 2008/0103971 A1 | 5/2008 | Lukose et al. |
| 2008/0140576 A1 | 6/2008 | Lewis et al. |
| 2008/0140681 A1 | 6/2008 | Ajibade |
| 2008/0184129 A1* | 7/2008 | Cancel .................. G06Q 30/02 715/741 |
| 2008/0189122 A1 | 8/2008 | Coletrane et al. |
| 2009/0016507 A1 | 1/2009 | Altberg et al. |
| 2009/0043805 A1 | 2/2009 | Masonis et al. |
| 2009/0044279 A1 | 2/2009 | Crawford et al. |
| 2009/0049036 A1 | 2/2009 | Juan et al. |
| 2009/0066722 A1 | 3/2009 | Kriger et al. |
| 2009/0094048 A1 | 4/2009 | Wallace et al. |
| 2009/0106043 A1 | 4/2009 | Buckwalter et al. |
| 2009/0144329 A1 | 6/2009 | Marlow |
| 2009/0164464 A1 | 6/2009 | Carrico et al. |
| 2009/0216734 A1 | 8/2009 | Aghajanyan et al. |
| 2009/0248599 A1 | 10/2009 | Hueter et al. |
| 2009/0299645 A1 | 12/2009 | Colby et al. |
| 2009/0319466 A1 | 12/2009 | Liu et al. |
| 2010/0002920 A1 | 1/2010 | Cosatto et al. |
| 2010/0036806 A1 | 2/2010 | Lam et al. |
| 2010/0042471 A1 | 2/2010 | Chang |
| 2010/0070350 A1 | 3/2010 | Paunikar et al. |
| 2010/0094767 A1 | 4/2010 | Miltonberger |
| 2010/0114614 A1 | 5/2010 | Sharpe |
| 2010/0145869 A1 | 6/2010 | Brown |
| 2010/0169262 A1* | 7/2010 | Kenedy ............... G06F 16/9535 707/E17.108 |
| 2010/0169376 A1 | 7/2010 | Chu |
| 2010/0262611 A1 | 10/2010 | Frind |
| 2010/0312713 A1* | 12/2010 | Keltner .................. G06Q 50/01 705/317 |
| 2010/0318544 A1 | 12/2010 | Nicolov |
| 2011/0045801 A1 | 2/2011 | Parker, II |
| 2011/0055210 A1 | 3/2011 | Meredith et al. |
| 2011/0082824 A1 | 4/2011 | Allison et al. |
| 2011/0107260 A1 | 5/2011 | Park et al. |
| 2011/0125509 A1 | 5/2011 | Lidstrom et al. |
| 2011/0131085 A1 | 6/2011 | Wey |
| 2011/0145238 A1 | 6/2011 | Stork |
| 2011/0167059 A1 | 7/2011 | Fallah |
| 2011/0178881 A1 | 7/2011 | Pulletikurty |
| 2011/0191768 A1 | 8/2011 | Smith |

(56) References Cited

U.S. PATENT DOCUMENTS

| | | |
|---|---|---|
| 2011/0208737 A1 | 8/2011 | Shmueli et al. |
| 2011/0219310 A1 | 9/2011 | Robson |
| 2011/0231396 A1 | 9/2011 | Dhara et al. |
| 2011/0270813 A1 | 11/2011 | Cok et al. |
| 2011/0306028 A1 | 12/2011 | Galimore |
| 2012/0005204 A1 | 1/2012 | Diaz et al. |
| 2012/0023566 A1 | 1/2012 | Waterson et al. |
| 2012/0059850 A1 | 3/2012 | Bent et al. |
| 2012/0088524 A1 | 4/2012 | Moldavsky et al. |
| 2012/0089618 A1 | 4/2012 | Anschutz et al. |
| 2012/0102410 A1 | 4/2012 | Gewecke et al. |
| 2012/0109959 A1 | 5/2012 | Benhadda |
| 2012/0110085 A1 | 5/2012 | Malik et al. |
| 2012/0123828 A1 | 5/2012 | Pahls et al. |
| 2012/0151417 A1 | 6/2012 | Wong et al. |
| 2012/0155296 A1 | 6/2012 | Kashanian |
| 2012/0158586 A1 | 6/2012 | Ganti et al. |
| 2012/0166285 A1 | 6/2012 | Shapiro et al. |
| 2012/0190386 A1 | 7/2012 | Anderson |
| 2012/0197802 A1 | 8/2012 | Smith et al. |
| 2012/0198002 A1 | 8/2012 | Goulart et al. |
| 2012/0278262 A1 | 11/2012 | Morgenstern et al. |
| 2012/0284212 A1 | 11/2012 | Lin et al. |
| 2012/0284341 A1* | 11/2012 | Masood ................ G06Q 50/01 709/205 |
| 2012/0290978 A1 | 11/2012 | Devecka |
| 2013/0028521 A1 | 1/2013 | Yabu |
| 2013/0097246 A1 | 4/2013 | Zifroni et al. |
| 2013/0135451 A1 | 5/2013 | Hou |
| 2013/0138741 A1 | 5/2013 | Redstone et al. |
| 2013/0139236 A1 | 5/2013 | Rubinstein et al. |
| 2013/0179504 A1* | 7/2013 | Adams .................. G06Q 50/01 709/204 |
| 2013/0204710 A1* | 8/2013 | Boland .................. G06Q 50/01 705/14.66 |
| 2013/0212680 A1 | 8/2013 | Winn et al. |
| 2013/0247149 A1 | 9/2013 | Sanft et al. |
| 2013/0262984 A1 | 10/2013 | Mehr et al. |
| 2013/0282745 A1 | 10/2013 | Mishra et al. |
| 2013/0297590 A1 | 11/2013 | Zukovsky et al. |
| 2013/0325948 A1 | 12/2013 | Chen et al. |
| 2014/0025702 A1 | 1/2014 | Curtiss et al. |
| 2014/0052861 A1 | 2/2014 | Frind et al. |
| 2014/0058763 A1 | 2/2014 | Zizzamia et al. |
| 2014/0079297 A1 | 3/2014 | Tadayon et al. |
| 2014/0095598 A1 | 4/2014 | Schornack et al. |
| 2014/0095603 A1 | 4/2014 | Bhardwaj et al. |
| 2014/0122628 A1 | 5/2014 | Yao et al. |
| 2014/0136933 A1 | 5/2014 | Berger et al. |
| 2014/0152773 A1 | 6/2014 | Ohba et al. |
| 2014/0156750 A1 | 6/2014 | De Cristofaro et al. |
| 2014/0207637 A1 | 7/2014 | Groarke |
| 2014/0258366 A1 | 9/2014 | L'Heureux et al. |
| 2014/0317736 A1 | 10/2014 | Cao et al. |
| 2015/0026027 A1 | 1/2015 | Priess et al. |
| 2015/0100530 A1 | 4/2015 | Mnih et al. |
| 2015/0120583 A1 | 4/2015 | Zarrella |
| 2015/0127590 A1 | 5/2015 | Gay et al. |
| 2015/0161649 A1 | 6/2015 | Eggleston et al. |
| 2015/0199010 A1 | 7/2015 | Coleman et al. |
| 2015/0348208 A1 | 12/2015 | Nordyke et al. |
| 2015/0379574 A1 | 12/2015 | Pattan et al. |
| 2016/0292688 A1 | 10/2016 | Barton et al. |
| 2017/0242569 A1 | 8/2017 | Frind et al. |
| 2018/0039773 A1 | 2/2018 | Levi et al. |
| 2018/0052991 A1 | 2/2018 | Levi et al. |
| 2020/0244760 A1 | 7/2020 | Levi et al. |

OTHER PUBLICATIONS

Arbelaitz et al., "Web usage and content mining to extract knowledge for modelling the users of the Bidasoa Turismo website and to adapt it," *Expert Systems with Applications* 40:7478-7491, 2013.
Artzi et al., "Predicting Responses to Microblog Posts".
Avrahami et al., "Responsiveness in Instant Messaging: Predictive Models Supporting Inter-Personal Communication".
"Binary Search Tree" Wikipedia—Feb. 24, 2015—11 pages.
Brammer, "Who Commits Online Advertising Fraud and How to Stop It," published online on Sep. 21, 2015, downloaded from http://blog.ezanga.com/blog/who-commits-online-advertising-fraud-and-how-to-stop-it on Jun. 16, 2018, 8 pages.
"Chargeback" Wikipedia—Feb. 24, 2015—4 pages.
Dokoohaki et al., "Mining Divergent Opinion Trust Networks through Latent Dirichlet Allocation," *2012 IEEE ACM International Conference on Advances in Social Networks Analysis and Mining*, Istanbul, Turkey, 2012, 879-886.
Fiore et al., "Assessing Attractiveness in Online Dating Profiles" CHI Friends, Foe, and Family, 2998, pp. 797-806.
Khadangi et al., "Measuring Relationship Strength in Online Social Networks based on users' activities and profile information," *3rd International Conference on Computer and Knowledge Engineering*, Ferdowsi University of Mashhad, Oct. 31 and Nov. 1, 2013, 5 pages.
Kononenko "Semi-Naïve Bayesian Classifier".
"Merchant Account" Wikipedia—Feb. 24, 2015—10 pages.
Moulin et al., "Support Vector Machines for Transient Stability Analysis of Large-Scale Power Systems," *IEEE Transactions on Power Systems* 79(2):818-825, 2004.
Notice of Allowance, dated Aug. 2, 2017, for U.S. Appl. No. 14/668,808, Levi et al., "Apparatus, Method and Article to Effect User Interest-Based Matching in a Network Environment," 10 pages.
Office Action, dated Dec. 29, 2017, for U.S. Appl. No. 14/575,888, MacKinnon, "Apparatus, Method and Article to Facilitate Exchange of Messages in a Network Environment," 31 pages.
Office Action, dated Feb. 1, 2018, for U.S. Appl. No. 14/638,225, Tekle et al., "Apparatus, Method and Article to Facilitate Automatic Detection and Removal of Fraudulent Advertising Accounts in a Network Environment," 38 pages.
Office Action, dated Feb. 28, 2018, for U.S. Appl. No. 14/679,792, Oldridge et al., "Apparatus, Method and Article to Predict and Prevent Chargebacks in a Network Environment," 64 pages.
Office Action, dated Mar. 20, 2018, for U.S. Appl. No. 14/737,121, Oldridge et al., "Apparatus, Method and Article to Facilitate User Behavioral Based Determination of User Values in a Network Environment," 39 pages.
Office Action, dated Jul. 26, 2018, for U.S. Appl. No. 14/575,888, MacKinnon, "Apparatus, Method and Article to Facilitate Exchange of Messages in a Network Environment," 41 pages.
Office Action, dated Aug. 28, 2018, for U.S. Appl. No. 15/782,354, Levi et al., "Apparatus, Method and Article to Facilitate Automatic Detection and Removal of Fraudulent User Information in a Network Environment," 9 pages.
Geroimenko (Ed.) et al., *Visualizing the Semantic Web*, Springer, London, 2006, Chapter 14, pp. 229-241, Paolillo et al., "Social Network Analysis on the Semantic Web: Techniques and Challenges for Visualizing FOAF," 13 pages.
Parimi et al., "Predicting Friendship Links in Social Networks Using a Topic Modeling Approach," *PAKDD, Proceedings, part II*, Shenzhen, China, May 2011, pp. 75-86.
Peled et al., "Entity Matching in Online Social Networks," *International Conference on Social Computing (SocialCom)*, Alexandria, VA, 2013, pp. 339-344.
Sharma et al., "A Neural Network based Approach for Predicting Customer Churn in Cellular Network Services," *International Journal of Computer Applications* (0975-8887) 27(11):26-31, 2011.
"Understanding Chargebacks . . . " DalPay—Feb. 24, 2015—6 pages.
Therneau et al., Mayo Clinic—Feb. 24, 2015—62 pages.
Zhao et al., "Relationship strength estimation for online social networks with the study on Facebook," *Neurocomputing* 95:89-97, 2012.
Frind et al., "Apparatus, Method and Article to Facilitate Matching of Clients in a Networked Environment," U.S. Appl. No. 14/339,328, filed Jul. 23, 2014, 135 pages.

(56) References Cited

OTHER PUBLICATIONS

Frind et al., "Apparatus, Method and Article to Facilitate Matching of Clients in a Networked Environment," Preliminary Amendment filed Jul. 23, 2014, for U.S. Appl. No. 14/339,328, 11 pages.
Frind et al., "Systems and Methods for Training and Employing a Machine Learning System in Evaluating Entity Pairs," U.S. Appl. No. 14/163,849, filed Jan. 24, 2014, 75 pages.
Office Action, dated Jan. 29, 2016, for U.S. Appl. No. 14/163,849, Frind et al., "Systems and Methods for Training and Employing a Machine Learning System in Evaluating Entity Pairs," 61 pages.
Frind et al., "Systems and Methods for Training and Employing a Machine Learning System in Evaluating Entity Pairs," Amendment filed May 27, 2016, for U.S. Appl. No. 14/163,849, 23 pages.
Office Action, dated Aug. 16, 2016, for U.S. Appl. No. 14/163,849, Frind et al. "Systems and Methods for Training and Employing a Machine Learning System in Evaluating Entity Pairs," 60 pages.
Notice of Allowance, dated Feb. 10, 2017, for U.S. Appl. No. 14/163,849, Frind et al., "Systems and Methods for Training and Employing a Machine Learning System in Evaluating Entity Pairs," 5 pages.
Frind et al., "System and Methods for Training and Employing a Machine Learning System in Evaluating Entity Pairs," U.S. Appl. No. 61/756,912, filed Jan. 25, 2013, 75 pages.
Frind, "System and Method for Adaptive Matching of User Profiles Based on Viewing and Contact Activity for Social Relationship Services," Preliminary Amendment filed May 24, 2011, for U.S. Appl. No. 12/488,512, 22 pages.
Office Action dated Aug. 16, 2011, for U.S. Appl. No. 12/488,512, Frind, "System and Method for Adaptive Matching of User Profiles Based on Viewing and Contact Activity for Social Relationship Services," 14 pages.
Frind, "System and Method for Adaptive Matching of User Profiles Based on Viewing and Contact Activity for Social Relationship Services," Amendment filed Nov. 16, 2011, for U.S. Appl. No. 12/488,512, 16 pages.
Office Action dated Mar. 5, 2012, For U.S. Appl. No. 12/488,512, Frind, "System and Method for Adaptive Matching of User Profiles Based on Viewing and Contact Activity for Social Relationship Services," 19 pages.
Frind, "System and Method for Adaptive Matching of User Profiles Based on Viewing and Contact Activity for Social Relationship Services," Amendmend, dated May 24, 2012, for U.S. Appl. No. 12/488,512, 20 pages.
Office Action dated May 19, 2014, for U.S. Appl. No. 12/488,512,Frind, "System and Method for Adaptive Matching of User Profiles Based on Viewing and Contact Activity for Social Relationship Services," 20 pages.
Frind, "System and Method for Adaptive Matching of User Profiles Based on Viewing and Contact Activity for Social Relationship Services," Amendment filed Aug. 12, 2014, for U.S. Appl. No. 12/488,512, 11 pages.
Office Action dated Nov. 18, 2014, for U.S. Appl. No. 12/488,512, Frind, "System and Method for Adaptive Matching of User Profiles Based on Viewing and Contact Activity for Social Relationship Services," 17 pages.
Frind, "System and Method for Adaptive Matching of User Profiles Based on Viewing and Contact Activity for Social Relationship Services," Response Under 37 CFR 1.116 filed Jan. 6, 2015, For U.S. Appl. No. 12/488,512, 12 pages.
Frind, "System and Method for Adaptive Matching of User Profiles Based on Viewing and Contact Activity for Social Relationship Services," Amendment filed Feb. 13, 2015, for U.S. Appl. No. 12/488,512, 12 pages.
Office Action, dated Jun. 24, 2015, for U.S. Appl. No. 12/488,512, Frind, "System and Method for Adaptive Matching of User Profiles Based on Viewing and Contact Activity for Social Relationship Services," 19 pages.
Frind, "System and Method for Adaptive Matching of User Profiles Based on Viewing and Contact Activity for Social Relationship Services," Amendment filed Sep. 24, 2015, for U.S. Appl. No. 12/488,512, 14 pages.
Frind, "System and Method for Adaptive Matching of User Profiles Based on Viewing and Contact Activity for Social Relationship Services," Amendment filed Mar. 11, 2016, for U.S. Appl. No. 12/488,512, 15 pages.
Levi et al., "Apparatus, Method and Article to Effect User Interest-Based Matching in a Network Environment," U.S. Appl. No. 14/668,808, filed Mar. 25, 2015, 111 pages.
Levi et al., "Apparatus, Method and Article to Effect User Interest-Based Matching in a Network Environment," U.S. Appl. No. 61/976,296, filed Apr. 7, 2014, 111 pages.
Levi et al., "Apparatus, Method and Article to Facilitate Automatic Detection and Removal of Fraudulent User Information in a Network Environment," U.S. Appl. No. 14/561,004, filed Dec. 4, 2014, 89 pages.
Office Action, dated Feb. 3, 2017, for U.S. Appl. No. 14/561,004, Levi et al., "Apparatus, Method and Article to Facilitate Automatic Detection and Removal of Fraudulent User Information in a Network Environment," 23 pages.
MacKinnon, "Apparatus, Method and Article to Facilitate Exchange of Messages in a Network Environment," U.S. Appl. No. 14/575,888, filed Dec. 18, 2014, 83 pages.
MacKinnon, "Apparatus, Method and Article to Facilitate Exchange of Messages in a Network Environment," U.S. Appl. No. 61/918,466, filed Dec. 19, 2013, 83 pages.
Oldridge et al., "Apparatus, Method and Article to Effect Electronic Message Reply Rate Matching in a Network Environment," U.S. Appl. No. 14/563,504, filed Dec. 8, 2014, 55 pages.
Office Action, dated Jul. 5, 2017, for U.S. Appl. No. 14/563,504, Oldridge et al., "Apparatus, Method and Article to Effect Electronic Message Reply Rate Matching in a Network Environment," 20 pages.
Oldridge et al., "Apparatus, Method and Article to Facilitate User Behavioral Based Dertermination of User Values in a Network Environment," U.S. Appl. No. 62/013,849, filed Jun. 18, 2014, 68 pages.
Oldridge et al. "Systems and Methods for Training and Employing a Machine Learning System in Providing Service Level Upgrade Offers," U.S. Appl. No. 61/974,129, filed Apr. 2, 2014, 95 pages.
Oldridge et al., "Systems and Methods for Training and Employing a Machine Learning System in Providing Service Level Upgrade Offers," U.S. Appl. No. 14/672,749, filed Mar. 30, 2015, 95 pages.
Tekle et al. "Apparatus, Method and Article to Facilitate Automatic Detection and Removal of Fraudulent Advertising Accounts in a Network Environment," U.S. Appl. No. 61/948,159, filed Mar. 5, 2014, 79 pages.
Tekle et al., "Apparatus, Method and Article to Facilitate Automatic Detection and Removal of Fraudulent Advertising Accounts in a Network Environment," U.S. Appl. No. 14/638,225, filed Mar. 4, 2015, 79 pages.
Office Action, dated Jul. 13, 2017, for U.S. Appl. No. 14/638,225, Tekle et al., "Apparatus, Method and Article to Facilitate Automatic Detection and Removal of Fraudulent Advertising Accounts in a Network Environment," 59 pages.
Office Action, dated Sep. 21, 2015, for U.S. Appl. No. 13/971,483, Frind et al. "Apparatus, Method and Article to Facilitate Matching of Clients in a Networked Environment," 25 pages.
Frind et al., "Apparatus, Method and Article to Facilitate Matching of Clients in a Networked Environment," Amendment filed Dec. 8, 2015, for U.S. Appl. No. 13/971,483, 33 pages.
Office Action, dated Apr. 6, 2016, for U.S. Appl. No. 13/971,483, Frind et al., "Apparatus, Method and Article to Facilitate Matching of Clients in a Networked Environment," 26 pages.
Frind et al., "Apparatus, Method and Article to Facilitate Matching of Clients in a Networked Environment," Response Under 37 CFR 1.116, filed Jul. 21, 2016, for U.S. Appl. No. 13/971,483, 21 pages.
Supplemental Notice of Allowability, dated Oct. 28, 2016, for U.S. Appl. No. 13/971,483, Frind et al., "Apparatus, Method and Article to Facilitate Matching of Clients in a Networked Environment," 9 pages.

(56) References Cited

OTHER PUBLICATIONS

Frind et al., "Apparatus, Method and Article to Facilitate Matching of Clients in a Networked Environment," U.S. Appl. No. 61/691,082, filed Aug. 20, 2012, 131 pages.
Oldridge et al., "Apparatus, Method and Article to Facilitate User Behavioral Based Determination of User Values in a Network Environment," U.S. Appl. No. 14/737,121, filed Jun. 11, 2015, 68 pages.
Oldridge et al., "Apparatus, Method and Article to Predict and Prevent Chargebacks in a Network Environment," U.S. Appl. No. 14/679,792, filed Apr. 6, 2015, 69 pages.
Frind et al., "Apparatus, Method and Article to Facilitate Matching of Clients in a Networked Environment," U.S. Appl. No. 61/857,617, filed Jul. 23, 2013,138 pages.
Levi et al., "Apparatus, Method and Article to Facilitate Automatic Detection and Removal of Fraudulent User Information in a Network Environment," U.S. Appl. No. 61/911,908, filed Dec. 4, 2013, 88 pages.
Oldridge et al., "Apparatus, Method and Article to Effect Electronic Message Reply Rate Matching in a Network Environment," U.S. Appl. No. 61/914,154, filed Dec. 10, 2013, 50 pages.
Office Action, dated Sep. 20, 2016, for U.S. Appl. No. 14/339,328, Frind et al., "Apparatus, Method and Article to Facilitate Matching of Clients in a Networked Environment," 30 pages.
Notice of Allowance, dated Feb. 3, 2017, for U.S. Appl. No. 14/339,328, Frind et al., "Apparatus, Method and Article to Facilitate Matching of Clients in a Networked Environment," 14 pages.
Office Action, dated Jul. 10, 2018, for U.S. Appl. No. 14/672,749, Oldridge et al., "Systems and Methods for Training and Employing a Machine Learning System in Providing Service Level Upgrade Offers," 66 Pages.
Notice of Allowance, dated Jun. 20, 2018, for U.S. Appl. No. 14/638,225, Tekle et al., "Apparatus, Method and Article to Facilitate Automatic Detection and Removal of Fraudulent Advertising Accounts in a Network Environment," 12 pages.
Gehani et al., "PAST : Probabilistic Authentication of Sensor Timestamps," *Proceedings of the 22$^{nd}$ Annual Computer Security Applications Conference (ACSAC'06)*, 2006, 10 pages.
Kapoumiotis et al., "Scam and Fraud Detection in VoIP Networks: Analysis and Countermeasures Using User Profiling," IEEE, 2011, 5 pages.
Srivastava et al., "Credit Card Fraud Detection Using Hidden Markov Model," *IEEE Transactions on Dependable and Secure Computing* 5(1):37-48, 2008.

\* cited by examiner

APPARATUS, METHOD AND ARTICLE TO IDENTIFY DISCREPANCIES BETWEEN CLIENTS AND IN RESPONSE PROMPT CLIENTS IN A NETWORKED ENVIRONMENT

BACKGROUND

Technical Field

The present disclosure generally relates to networked systems and methods and articles. In particular the present disclosure relates to systems, methods, and articles that automate comparison of client-related components and actions and prompt clients in response to discrepancies.

Description of the Related Art

A hosted service may analyze certain information or data and generate a prompt to an entity seeking to find a match with another entity. Entities may, for example, take the form of individuals who are attempting to find other individuals or businesses. For instance, an individual may be seeking a social relationship with another individual. Social relationships may, for example, include platonic friendships, romantic dating, activities (e.g., biking, hiking, sports teams), or seeking partners for short or long term social commitments (e.g., marriage, civil union). Alternatively, an individual may seek a business relationship with another individual or a business entity. Business relationships may include long term business relationships (e.g., professional relationships) or short term relationships (e.g., single job relationships). For instance, an individual may seek a health care provider (e.g., physician, dentist), some other professional (e.g., accountant, lawyer, plumber, electrician, or contractor) or some other business relationship (e.g., day laborer, house cleaner, sitter, or childcare). Also, for instance, an employer may seek job applicants to fill one or more positions.

An entity seeking a relationship may specify some necessary or desired criteria (e.g., constraints) which may be compared with respect to respective aspects, attributes, or characteristics of a pool of possible candidates to find one or more matches or potential candidates. Additionally or alternatively, the entity seeking the relationship may specify criteria about themselves, which may be compared with respect to aspects, attributes, or characteristics of the pool of possible candidates to find one or more matches or potential candidates.

Many end user clients may find the user of such hosted services frustrating, particularly if the end user client is not finding suitable potential candidates or matches, or is not receiving a sufficient level of inquiries and/or responses to inquiries. Improving the end user experience is desirable since these hosted services provide real value if properly used and given sufficient opportunity to produce potential candidates or matches.

BRIEF SUMMARY

End users of hosted services may become frustrated when few potential candidates or matches are provided. End users may likewise become frustrated when the end user receives few inquiries from other end users. End users may further become frustrated when their attempts to contact other end users prove unsuccessful, often not even eliciting a response. All of these are considered unsuccessful outcomes. In contrast, successful outcomes are those in which an end user receives ample selection of potential candidates or matches, receives ample inquiries from other end users, and receives responses to their own inquires.

Often times the difference between unsuccessful and successful outcomes are well in control of the end user. However, the end user fails to appreciate the reasons for the lack of success, or lacks some skills which successful end users possess. For example, an end user may be too terse in a end user's own profile or in a message sent to other end users. On the other hand, an end user may be too verbose in the end user's own profile or message. Also for example, an end user may not update the end user's own profile or pictures frequently enough. As a further example, the end user may not send a sufficient number of messages to other end users, or reply to other end user's messages frequently or promptly enough. As an even further example, the end user's own actions may appear inconsistent with the end user's stated intent or may otherwise be sending the wrong message.

Many of these failings are easily addressable if discovered and brought to the attention of the end user. Thus, various approaches to identifying these failings are described herein, as well as prompting or coaching an end user to take corrective actions. These various failings are identified as discrepancies from desired behavior. The desired behavior may be determined by how other end users are acting or performing, particularly other end users who are more successful in finding potential candidates or matches, A method of operating a processor-based hosted services system to provide services to a plurality of remotely located users via user operated processor-based devices over network infrastructures may be summarized as including for each of a number of users, reviewing by at least one processor of the processor-based hosted services system a number of components of a respective user profile for the user relative to a set of defined evaluation criteria that specifies defined evaluation criteria for at least some of those components. In response to detecting at least one discrepancy between the components of the respective user profile and the set of defined evaluation criteria, the method includes causing a prompt to be provided to the user indicative of the discrepancy.

The reviewing process may be responsive to a request received from the respective user. Reviewing the number of components of the respective user profile may be automatically performed in response to an updating of the user profile by the respective user. Reviewing the number of components of the respective user profile may be automatically performed on a periodic basis, independent of any requests received from the respective user or any updating of the user profile by the respective user. Reviewing the number of components of the respective user profile may include: determining how recently the respective user profile was updated; comparing a recentness of the update or addition of the respective user profile to a defined evaluation recentness; and identifying a discrepancy if the recentness of the update of the respective user profile is longer than the defined evaluation recentness. Reviewing the number of components of the respective user profile may include: determining how frequently the respective user profile is updated; comparing the determined frequency of the updating of the respective user profile to a defined evaluation frequency; and identifying a discrepancy if the frequency of the updating of the respective user profile is less than the defined evaluation frequency. Reviewing the number of components of the respective user profile may include: determining how recently an image of the user was updated or added to the respective user profile; comparing a recentness of the image update or addition with a defined evaluation recentness; and identifying a discrepancy if the recentness of the image update or addition is longer than the defined evaluation recentness. Reviewing the number of components of the respective user profile may include: determining a length of a profile description, and identifying a discrepancy if the determined length of the profile description is at least one of shorter than a defined evaluation minimum profile description length or greater than a defined evaluation maximum profile description length. Reviewing the number of components of the respective user profile may include comparing at least two profile components for consistency between one another.

Comparing at least two profile components for consistency between one another may include comparing a user-specified current relationship status and a user-specified type of desired relationship for consistency. Causing a prompt to be provided to the user may include causing a presentation of at least an indication of an existence of an apparent inconsistency and at least one or more user-selectable icons, selection of which is indicative of whether the user intended the apparent inconsistency. Causing a prompt to be provided to the user may include causing comparative information to be presented to the user, the comparative information indicative of components of user profiles for other ones of the users who share at least one attribute with the user. Causing a prompt to be provided to the user may include causing presentation of comparative information to the user of, the comparative information representative of at least a defined minimum number of other ones of users.

The method of operating a processor-based hosted services system to provide services to a plurality of remotely located users via user operated processor-based devices over network infrastructures may include, in response to an insufficient number of other ones of the users being available based on a set of defined criteria including at least a defined geographic area, generating the comparative information based on other ones of the users from a wider geographic area than the defined geographic area specified in the set of defined criteria to achieve at least the defined minimum number of other ones of the users.

The method of operating a processor-based hosted services system to provide services to a plurality of remotely located users via user operated processor-based devices over network infrastructures may further include generating the comparative information based on only on active users.

Causing a prompt to be provided to the user may include causing information that compares a total number of images of the user to a total number of images for a set of other ones of the users who share common demographic information with the user. Causing a prompt to be provided to the user may include causing information that compares how often the user updates images of the user to how often a set of other ones of the users who share common demographic information with the user update respective images to be presented to the user. Causing a prompt to be provided to the user may include causing information that compares a total number of self identified interests of the user to a total number of self identified interests for a set of other ones of the users who share common demographic information with the user to be presented to the user. Causing a prompt to be provided to the user may include causing information that compares a length of self description of the user to a length of a self description for a set of other ones of the users who share common demographic information with the user to be presented to the user. Causing a prompt to be provided to the user may include causing information that compares how frequently the user updates the respective user profile to how frequently a set of other ones of the users who share common demographic information with the user update the respective user profiles to be presented to the user. Causing a prompt to be provided to the user may include causing information that compares how frequently the user accesses the processor-based hosted services system to how frequently a set of other ones of the users who share common demographic information with the user access the processor-based hosted services system to be presented to the user. Causing a prompt to be provided to the user may include causing information that compares how frequently the user sends messages to other users to how frequently a set of other ones of the users who share common demographic information with the user send messages to other users. Causing a prompt to be provided to the user may include causing information that compares how frequently the user responds to messages from other users to how frequently a set of other ones of the users who share common demographic information with the user respond to messages from other users to be presented to the user. Causing a prompt to be provided to the user may include causing a visual indication to be displayed at least proximate at least one of an item of information or a field in which at least an apparent discrepancy appears.

The method of operating a processor-based hosted services system to provide services to a plurality of remotely located users via user operated processor-based devices over network infrastructures may further include causing visual indication in the form of a highlighting of an item of information or a field, a bounding of an item of information or a field, or displaying a balloon at least proximate at least one of an item of information or a field in which at least an apparent discrepancy appears.

Causing a prompt to be provided to the user may include causing an anchored evaluation prompt to be displayed on each of a plurality of pages presented to the user; the anchored evaluation prompt may be indicative of a respective evaluation of the user. Causing an anchored health prompt to be displayed on each of a plurality of pages presented to the user includes causing a meter to be displayed on the plurality of pages presented to the user; the meter may be indicative of the respective evaluation of the user. The meter may be indicative of a success rate of the user. The meter may be indicative of an evaluation of the respective user profile of the user relative to other user profiles of other ones of the users.

The method of operating a processor-based hosted services system to provide services to a plurality of remotely located users via user operated processor-based devices over network infrastructures may further include determining a number of selections by other users of at least one of a field or a piece of content of the respective user profile of the user prior to a change in the at least one of the field or the piece of content of the respective user profile of the user; determining a number of selections by other users of at least one of a field or a piece of content of the respective user profile of the user following to the change in the at least one of the field or the piece of content of the respective user profile of the user; comparing the number of selections by other users of at least one of the field or the piece of content of the respective user profile of the user following the change to the number of selections by other users of at least one of the field or the piece of content of the respective user profile of the user prior to the change; and reporting a result of the comparing to the user.

The method of operating a processor-based hosted services system to provide services to a plurality of remotely located users via user operated processor-based devices over network infrastructures may further include determining a value indicative of lingering by other users of at least one of a field or a piece of content of the respective user profile of the user prior to a change in the at least one of the field or the piece of content of the respective user profile of the user; determining a value indicative of lingering by other users of at least one of a field or a piece of content of the respective user profile of the user following the change in the at least one of the field or the piece of content of the respective user profile of the user; comparing the value indicative of lingering by other users of at least one of the field or the piece of content of the respective user profile of the user following the change to the value indicative of lingering by other users of at least one of the field or the piece of content of the respective user profile of the user prior to the change; and reporting a result of the comparing to the user.

The method of operating a processor-based hosted services system to provide services to a plurality of remotely located users via user operated processor-based devices over network infrastructures may further include determining a frequency of sending messages to other users by the user; comparing the determined frequency to a defined frequency threshold; and, in response to the determined frequency being below the defined frequency threshold, prompting the user to send a message.

The method of operating a processor-based hosted services system to provide services to a plurality of remotely located users via user operated processor-based devices over network infrastructures may further include identifying a set of other users based on information supplied by the user, the information supplied by the user indicative of attributes the user desires in other users; determining a set of shared attributes the other users in the identified set of other users desire; and providing the user with an indication of at least some of the shared attributes in the determined set of shared attributes.

The method of operating a processor-based hosted services system to provide services to a plurality of remotely located users via user operated processor-based devices over network infrastructures may further include automatically segregating a number of message sent to the user based on at least one defined criteria. The automatically segregating may be based at least in part on a number of user specified criteria. The user specified criteria may include a number of user specified key words or key phrases. The automatically segregating may be based at least in part on a number of system specified criteria. The system specified criteria may include a number of system specified key words or key phrases. The automatically segregating may be based at least in part on a length of the respective message. The messages may be segregated into a set of delivered messages and a set of quarantined messages.

A processor-based hosted services system to provide services to a plurality of remotely located users via user operated processor-based devices over network infrastructures may be summarized as including a number of communications ports that provide communications with a plurality of user devices. The end user devices may be logically associatable with a plurality of user client accounts of the processor-based hosted services. The user client accounts may be logically associable with user clients of the processor-based hosted service. At least one nontransitory processor-readable medium stores at least one of processor executable instructions or data. At least one processor is communicatively coupled to the communications ports and at least one nontransitory processor-readable medium, and that: for each of a number of user client accounts, reviews by at least one processor of the processor-based hosted services system a number of components of a respective user profile for the user relative to a set of defined evaluation criteria that specifies defined evaluation criteria for at least some of those components; and in response to detecting at least one discrepancy between the components of the respective user profile and the set of defined evaluation criteria, causes a prompt to be provided to the user indicative of the discrepancy.

The at least one processor may review the number of components in response to a request received from the respective user. The at least one processor may review the number of components automatically in response to an updating of the user profile by the respective user. The at least one processor may review the number of components automatically on a periodic basis, independent of any requests received from the respective user or any updating of the user profile by the respective user. The at least one processor may further: determine how recently the respective user profile was updated; compare a recentness of the update or addition of the respective user profile to a defined evaluation recentness; and identify a discrepancy if the recentness of the update of the respective user profile is longer than the defined evaluation recentness. The at least one processor may further: determine how frequently the respective user profile is updated; compare the determined frequency of the updating of the respective user profile to a defined evaluation frequency; and identify a discrepancy if the frequency of the updating of the respective user profile is less than the defined evaluation frequency.

The at least one processor may further: determine how recently an image of the user was updated or added to the respective user profile; compare a recentness of the image update or addition with a defined evaluation recentness; and identify a discrepancy if the recentness of the image update or addition is longer than the defined evaluation recentness. The at least one processor may further: determine a length of a profile description, and identify a discrepancy if the determined length of the profile description is at least one of shorter than a defined evaluation minimum profile description length or greater than a defined evaluation maximum profile description length. The at least one processor may further compare at least two profile components for consistency between one another. The at least one processor may further compare a user specified current relationship status and a user specified type of desired relationship for consistency. The at least one processor may further cause a prompt to be provided to the user and cause a presentation of at least an indication of an existence of an apparent inconsistency and at least one or more user selectable icons, selection of which is indicative of whether the user intended the apparent inconsistency. The at least one processor may further cause comparative information to be presented to the user; the comparative information may be indicative of components of user profiles for other ones of the users who share at least one attribute with the user. The at least one processor may further cause presentation of comparative information to the user; the comparative information may be representative of at least a defined minimum number of other ones of users. In response to an insufficient number of other ones of the users being available based on a set of defined criteria including at least a defined geographic area, the at least one processor may generate the comparative information based on other ones of the users from a wider geographic area than the defined geographic area specified in the set of defined criteria to achieve at least the defined minimum number of other ones of the users.

The at least one processor may generate the comparative information based only on active users. The at least one processor may further cause information that compares a total number of images of the user to a total number of images for a set of other ones of the users who share common demographic information with the user. The at least one processor may compare how often the user updates images of the user to how often a set of other ones of the users who share common demographic information with the user update respective images. The at least one processor may compare a total number of self identified interests of the user to a total number of self identified interests for a set of other ones of the users who share common demographic information with the user. The at least one processor may compare a length of self description of the user to a length of a self description for a set of other ones of the users who share common demographic information with the user. The at least one processor may compare how frequently the user updates the respective user profile to how frequently a set of other ones of the users who share common demographic information with the user update the respective user profiles. The at least one processor may compare how frequently the user accesses the processor-based hosted services system to how frequently a set of other ones of the users who share common demographic information with the user access the processor-based hosted services system. The at least one processor may compare how frequently the user sends messages to other users to how frequently a set of other ones of the users who share common demographic information with the user send messages to other users. The at least one processor may compare how frequently the user responds to messages from other users to how frequently a set of other ones of the users who share common demographic information with the user respond to messages from other users.

The at least one processor may cause a visual indication to be displayed at least proximate at least one of an item of information or a field in which at least an apparent discrepancy appears. The at least one processor may cause visual indication in the form of a highlighting of an item of information or a field, a bounding of an item of information or a field, or displaying a balloon at least proximate at least one of an item of information or a field in which at least an apparent discrepancy appears. The at least one processor may cause an anchored evaluation prompt to be displayed on each of a plurality of pages presented to the user; the anchored evaluation prompt may be indicative of a respective evaluation of the user. The at least one processor may cause an anchored evaluation prompt to be displayed on each of a plurality of pages presented to the user that may include causing a meter to be displayed on the plurality of pages presented to the user; the meter may be indicative of the respective evaluation of the user. The meter may be indicative of a success rate of the user. The meter may be indicative of an evaluation of the respective user profile of the user relative to other user profiles of other ones of the users.

The processor-based hosted services system may further include: determining a number of selections by other users of at least one of a field or a piece of content of the respective user profile of the user prior to a change in the at least one of the field or the piece of content of the respective user profile of the user; determining a number of selections by other users of at least one of a field or a piece of content of the respective user profile of the user following the change in the at least one of the field or the piece of content of the respective user profile of the user; comparing the number of selections by other users of at least one of the field or the piece of content of the respective user profile of the user following the change to the number of selections by other users of at least one of the field or the piece of content of the respective user profile of the user prior to the change; and reporting a result of the comparing to the user.

The processor-based hosted services system may further include determining a value indicative of lingering by other users on at least one of a field or a piece of content of the respective user profile of the user prior to a change in the at least one of the field or the piece of content of the respective user profile of the user; determining a value indicative of lingering by other users on at least one of a field or a piece of content of the respective user profile of the user following to the change in the at least one of the field or the piece of content of the respective user profile of the user; comparing the value indicative of lingering by other users on at least one of the field or the piece of content of the respective user profile of the user following the change to the value indicative of lingering by other users on at least one of the field or the piece of content of the respective user profile of the user prior to the change; and reporting a result of the comparing to the user.

The processor-based hosted services system may further include: determining a frequency of sending messages to other users by the user; comparing the determined frequency to a defined frequency threshold; in response to the determined frequency being below the defined frequency threshold, prompting the user to send a message. The processor-based hosted services system may further include: identifying a set of other users based on information supplied by the user, the information supplied by the user indicative of attributes the user desires in other users; determining a set of shared attributes the other users in the identified set of other users desire; and providing the user with an indication of at least some of the shared attributes in the determined set of shared attributes. The processor-based hosted services system may further include automatically segregating a number of messages sent to the user based on at least one defined criteria. The at least one processor may automatically segregate based at least in part on a number of user specified criteria. The user specified criteria may include a number of user specified key words or key phrases. The at least one processor may automatically segregate based at least in part on a number of system specified criteria. The system specified criteria may include a number of system specified key words or key phrases. The automatically segregating may be based at least in part on a length of the respective message. The messages may be segregated into a set of delivered messages and a set of quarantined messages.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computer systems, server computers, and/or communications networks have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Figure 1:
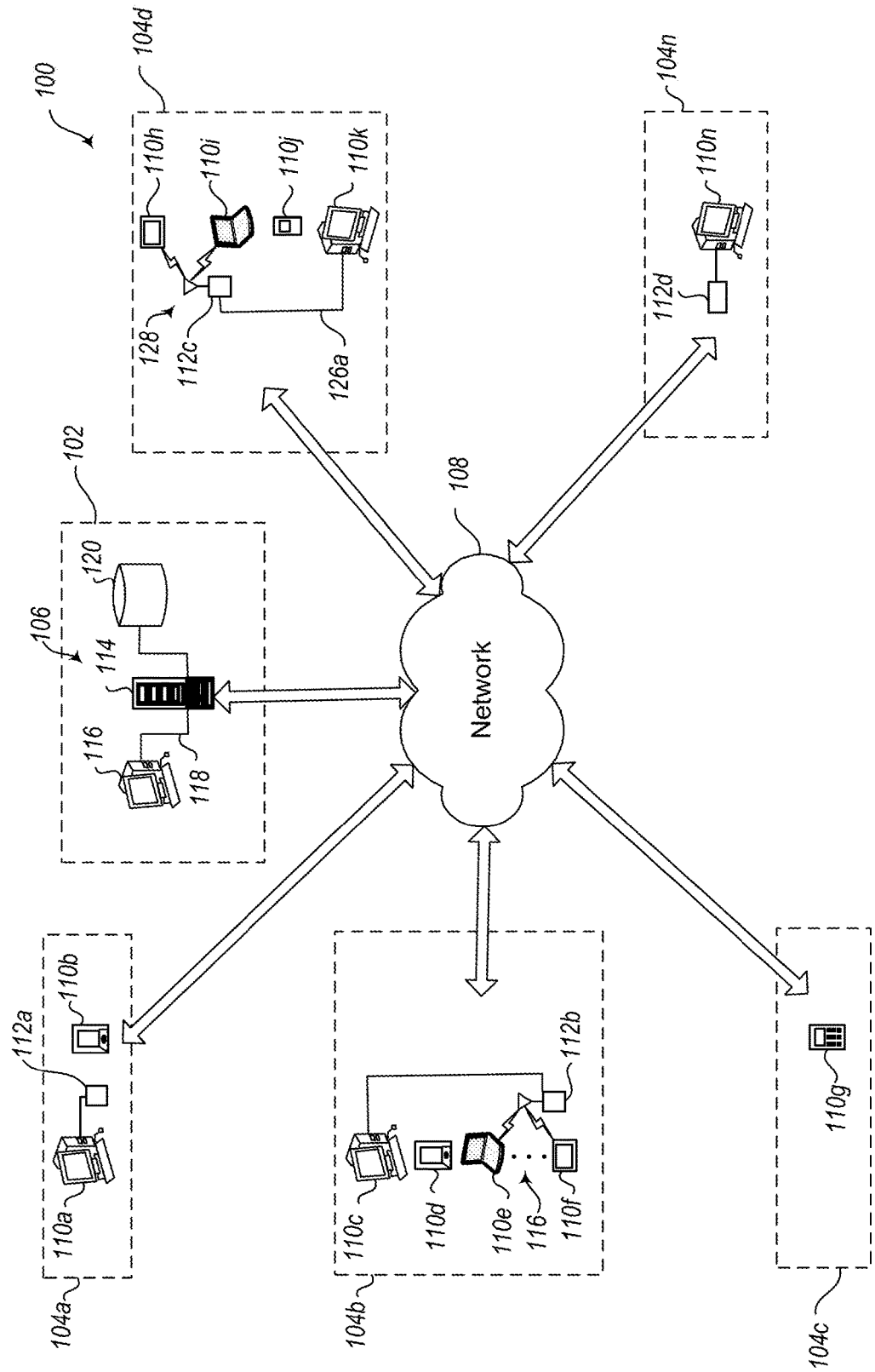
FIG. 1 is a schematic view of a networked processor-based environment to provide services to a plurality of remotely located users via user operated processor-based devices over a network, according to one illustrated embodiment.

FIG. 1 shows a networked environment 100 in which hosted services are provided by a service entity 102 to a plurality of end user client entities 104a-104n (only five shown, collectively 104), according to one illustrated embodiment.

The service entity 102 operates one or more hosted services systems 106. The hosted services system(s) 106 is(are) communicatively coupled or communicatively coupleable via one or more networks 108 to one or more processor-based devices 110a-110n (5 shown, collectively 110) associated with the end user client entities 104.

The service entity 102 may take any of a variety of forms. For example, the service entity 102 may take the form of an individual or business that provides host services, for instance hosted services that allow end user entities to identify potential candidates or matches for various types of relationships (e.g., personal, business, consumer). The hosted services advantageously include discrepancy identification and prompting services. The hosted services may include identifying discrepancies between a given end user entities' 104a information, actions, and/or activities, and those of other end user entities 104b-104n. Particularly, the discrepancies may be based on a set of other end users who are classified or considered as having relative success in use of the hosted services. Such success may, for example, be indicated by the number or percentage of potential candidates or matches and/or a level or frequency of interactions with potential candidates or matches. The hosted services may also include providing discrepancy prompts, suggestions, and/or indicators to end user client entities 104a for whom discrepancies have been identified. For example, if, as compared to other end user client entities 104b-104n with relatively high rates of positive interactions with other end user client entities 104b-104n (i.e., successful), the end user client entity 104a has one or more discrepancies in profile attributes or characteristics and/or in actions or activities, the service entity 102 may prompt the user 104a to change/update the end user client entities' profile and/or change his or her acts or activities to improve the likelihood of increasing positive interactions. Criteria may, for example, include maintaining an end user profile with sufficient images or photographs and/or with images or photographs that are sufficiently recent, frequency of update in profile information and/or images or photographs, evaluation of description lengths, frequency of attempts to contact other end user entities, frequency and/or promptness in responding contact attempts from or by other end user entities, and/or frequency of use of the hosted services.

The end user client entities 104 may take any variety of forms, for example, being of any of a variety of sizes. In many instances, the end user client entities 104 will be individuals looking to establish relationships with other individuals. Alternatively, the end user client entities 104 will be individuals looking to establish relationships with businesses (e.g., sole proprietorship, small corporations, partnerships, limited partnerships, limited liability companies, small or large corporations, multi-national corporations, other companies or businesses). As a further alternative, the end user client entities 104 may be businesses looking to establish relationships with other businesses or with individuals.

Each end user client entity 104 may be logically or otherwise associated with one or more processor-based devices 110a-110n, at least when interacting with the hosted service. The processor-based devices 110 may take any of a large variety of forms, including but not limited to personal computers (e.g., desktop computers 110a, 110c, 110k, or laptop computers 110e, net book computers 110i, tablet computers 110f, 110h, smart phones 110b, 110d, 110g, 110j, workstation computers 110n, and/or mainframe computers (not shown), and the like.

Notably, some end user client entities 104c, 104n may be logically associated with a single processor-based device 110g, 110n, respectively. In many instances, each respective end user client entity 104a, 104b, 104d may be logically associated with two or more processor-based devices. The logical association may be established via an account record or other data structure which may be set up when the end user client entity 104 registers with the service entity 102. For example, an account may be set up for the end user client entity 104, which specifies device address information (e.g., uniform resource locator or URL, phone number, SIM mobile subscriber identifier, mobile equipment identifier, MAC address) for one or more processor-based devices 110. The logical association may be established on an ad hoc basis, for example in response to an end user client entity 104 logging into a portal (e.g., Web portal) using one or more applications (e.g., browser) executed on or by one of the processor-based devices 110. Such may include the entering of a user name and a password by the end user client entity 104, and verification of the user name and password with an end user client entity account by the hosted services systems 106. Such ad hoc logical associations may be temporary, and may move from processor-based device 110 to processor-based device 110 as the particular end user client entity 104 moves.

The processor-based devices 110 are capable of communications, for example via one or more networks 108 (e.g., Wide Area Networks, Local Area Networks), for instance packet switched communications networks, such as the Internet, Worldwide Web portion of the Internet, extranets, intranets, and/or various other types of telecommunications networks such as cellular phone and data networks, and plain old telephone system (POTS) networks. The type of communications infrastructure should not be considered limiting. One or more communications interface devices 112a-112d (four shown, collectively 112) may provide communications between the processor-based device 100 and the network(s) 108. The communications interface devices 112 may take any of a large variety of forms, including modems (e.g., DSL modem, cable modem), routers, network switches, and/or bridges, etc.

The hosted services system 106 operates as an intermediary between the processor-based devices 110 of the end user client entities 104. The hosted services may include identifying potential candidates or matches for one end user client with other end user clients. The hosted services may also include evaluating a given end user client's end user entity profiles, actions and activities relative to other end user clients to identify discrepancies. The hosted services may also include prompting the given end user client to change the end user's end user entity profile, actions and/or activities to be more similar to those of other end user entity clients that have success with the hosted services system 106, for instance having positive interactions with other end user entities and/or establishing a relationship with another end user client entity 104. In some implementations, a backend algorithm for evaluating criteria or attribute and generating matches or potential candidates may be modified to address discrepancies. Such may, for example, be done on an end user by end user basis. Thus, for certain end users the algorithm may weight or take into account certain parameters or attributes differently than it would for other end users.

The hosted services system 106 may have one or more hosted services server computers 114 (only one illustrated) to provide electronic communications either externally from and/or internally within the service entity 102. To handle the load of multiple end user client entities 104, the hosted services system 106 will typically have more than one hosted services server computer system 114. The hosted services system 106 may include one or more terminals or personal computers 116 (only one shown), communicatively coupled to the hosted services server computer 114 via one or more wired or wireless networks 118 (only one shown). The terminals or personal computers 116 allow input and output by an end user (e.g., employee or contractor of the hosted services entity 102).

The hosted services system 106 includes at least one nontransitory computer- or processor-readable storage medium 120 (e.g., hard drive, RAID, RAM). The nontransitory computer- or processor-readable storage medium 120 stores a variety of information about the end user client entities 104, facilitating the automated analyzing, finding and reporting of matches between the end user client entities 104, and optionally the fostering of communications there between, for instance, including the transmission of electronic correspondence including electronic messages and electronic replies or responses thereto.

In most implementations, the aspects, attributes or characteristics of the end user client entities 104 will be stored by the hosted services server computer 114 and/or computer- or processor-readable storage medium 120, for instance, in an "available end user clients" database or other data structure(s). The hosted services server computer 114 may, from time-to-time, import or write end user aspects, attributes or characteristics to the available end user clients database stored on the computer- or processor-readable storage medium 120. The hosted service servers computer 114 may, from time-to-time, retrieve or extract the end user aspects, attributes or characteristics from the available end user clients database stored on the computer- or processor-readable storage medium 120. For example, the hosted services server computer 114 may retrieve the aspects, attributes or characteristics of the end user client entities 104 in response to a query. For example, the hosted services server computer 114 may retrieve the aspects, attributes or characteristics of a particular end user client entities 104a in response to a query by one end user client entity seeking to establish a successful relationship with another end user client entity. In response, the hosted services server computer 114 may retrieve the aspects, attributes or characteristics of successful end user client entities 104 and review and compare the aspects, attributes or characteristics of the end user client entity 104a with the corresponding aspects, attributes or characteristics of other end user client entities 104. It may be particularly advantageous to compare to a subset of all other end user client entities 104b-104n, the subset including only those end user client entities 104b-104n who are classified or otherwise considered as successful end user client entities. Successful end user client entities 104 may include those end user client entities that have a suitable or defined level of positive interactions with other end user client entities, whether or not such result is a long term relationship. Thus, successful end user client entities may include those end user client entities who receive a defined number of contact attempts from other end user client entities. Successful end user client entities may include those end user client entities who receive a defined number of contact attempts from other end user client entities that meet some specified criteria. For example, receiving contact attempts from other end user client entities that are deemed a good or very good potential candidate for a defined type of relationship or match. Additionally or alternatively, receiving contact attempts from other end user client entities which result in a high rate of response to the contact attempts and/or with a live meeting between the end user client entities. In response to detection of one or more discrepancies, the hosted service servers computer 114 may cause a prompt to be provide to the end user client entity 104a indicative of such discrepancy, and possibly including suggestions for addressing or correcting the discrepancy. Prompts may be provided for any one discrepancy. Alternatively or additionally, prompts may be provided only if a defined number of discrepancies are identified. Alternatively, prompts may be provided only for discrepancies outside some range, for example exceeding or falling below some threshold value(s). Some discrepancies may be considered critical discrepancies, automatically trigger a prompt. Other discrepancies may be considered non-critical discrepancies, triggering a prompt only if the discrepancy is sufficiently large and/or only if there are a sufficient number of non-critical discrepancies.

Advantageously, aspects, attributes, or characteristics of successful end user client entities 104 will be stored by the hosted services server computer 114 and/or computer- or processor-readable storage medium 120, for instance, in a "successful end user client" database or other data structure(s), or perhaps in a "successfully matched end user client" in which the information of a matched pair of end user clients is stored. The hosted services server computer 114 may, from time-to-time, import or write end user aspects, attributes or characteristics to the successful end user clients database stored on the computer- or processor-readable storage medium 120. The hosted services server computer 114 may, from time-to-time, retrieve or extract the end user aspects, attributes or characteristics from successful end user clients and/or successfully paired end user clients database stored on the computer- or processor-readable storage medium 120.

While illustrated as a single nontransitory computer- or processor-readable storage medium 120, in many implementations the nontransitory computer- or processor-readable storage medium 120 may constitute a plurality of nontransitory storage media. The plurality of nontransitory storage media may be commonly located at a common location, or distributed at a variety of remote locations. Thus, the successful end user clients database and/or the successfully matched end user client database may be implemented in one, or across more than one, nontransitory computer- or processor-readable storage media. Such database(s) may be stored separately from one another on separate computer- or processor-readable storage medium 120 or may be stored on the same computer- or processor-readable storage medium 120 as one another. The computer- or processor-readable storage medium 120 may be co-located with the hosted services server computer system 114, for example, in the same room, building or facility. Alternatively, the computer- or processor-readable storage medium 120 may be located remotely from the hosted services server computer system 114, for example, in a different facility, city, state or country. Electronic or digital information, files or records or other collections of information may be stored at specific locations in non-transitory computer- or processor-readable media 120, thus are logically addressable portions of such media, which may or may not be contiguous.

While FIG. 1 illustrates a representative networked environment 100, typical networked environments may include many additional computer systems and entities. The concepts taught herein may be employed in a similar fashion with more populated networked environments than that illustrated.

Figure 2:
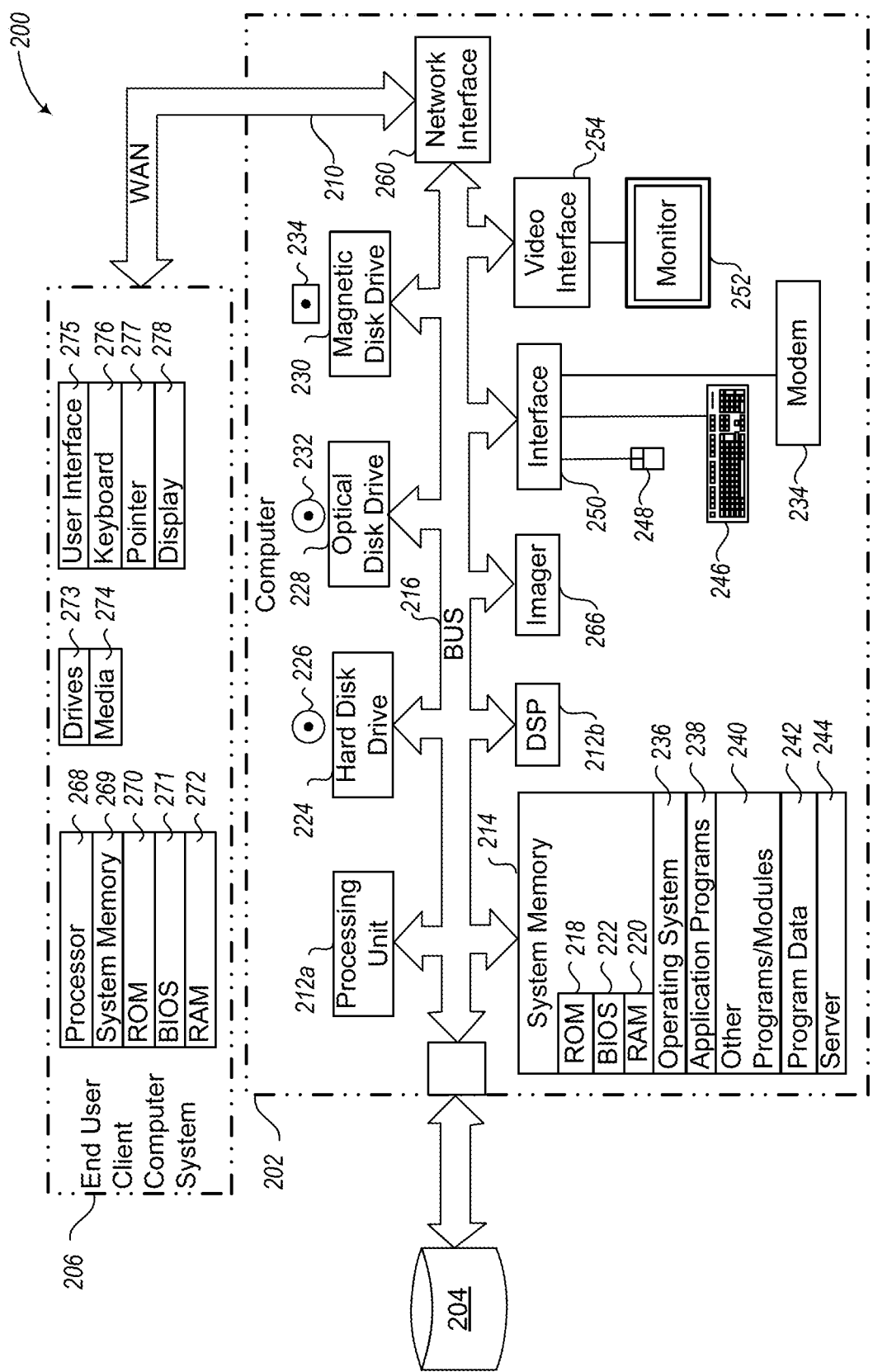
FIG. 2 is a functional block diagram of a hosted service system for discrepancy detection and prompting networked to one of the end user client processor-based devices, according to one illustrated embodiment.

FIG. 2 shows a networked environment 200 comprising one or more hosted services server computer systems 202 (only one illustrated) and one or more associated nontransitory computer- or processor-readable storage medium 204 (only one illustrated). The associated nontransitory computer- or processor-readable storage medium 204 is communicatively coupled to the hosted services server computer system(s) 202 via one or more communications channels, for example, one or more parallel cables, serial cables, or wireless channels capable of high speed communications, for instance, via FireWire®, Universal Serial Bus® (USB) 2 or 3, and/or Thunderbolt®, Gigabyte Ethernet®.

The networked environment 200 also comprises one or more end user client entity associated processor-based systems 206 (only one illustrated). The end user client entity associated processor-based systems 206 are communicatively coupled to the hosted services server computer system(s) 202 by one or more communications channels, for example, one or more wide area networks (WANs) 210, for instance the Internet or Worldwide Web portion thereof.

In operation, the end user client entity associated processor-based systems 206 typically function as a client to the hosted services server computing system 202. In operation, the hosted services server computer systems 202 typically functions as a server to receive requests or information from the end user client entity associated processor-based systems 206.

The hosted services server computer systems 202 may update a respective end user client profile based on received information. The hosted services server computer systems 202 may track actions or activities by the end user client. For example, the hosted services server computer systems 202 may track frequency of use of the hosted services. The hosted services server computer systems 202 may track frequency and/or recentness of end user client profile updating. The hosted services server computer systems 202 may track frequency and/or recentness of end user client profile images or photographs. The hosted services server computer systems 202 may track frequency and/or recentness of end user client profile attempts to contact other end user clients. The hosted services server computer systems 202 may track frequency and/or recentness and/or promptness of responding to contact attempts from other end user client entities.

The hosted services server computer systems 202 may evaluate various attributes of the end user client entity's profile, actions and activities relative to those of other end user client entities, for instance successful end user client entities, in order to determine or identify discrepancies therebetween. For example, the hosted services server computer systems 202 may compare component(s) of the end user client entity's end user client profile to components of successful end user client entities' end user client profiles (e.g., components compiled into a set of evaluation criteria to compare with component(s) of the end user client entity). If at least one discrepancy is found, the hosted services server computer systems 202 may provide prompts and suggestions to the end user client entity that are indicative of the discrepancy. The requests may include information, for example, an end user client entity's own aspects, attributes, or characteristics. The information for identification or classification of end user clients as being successful may be self-reported and/or may be discerned automatically for activities occurring via the hosted services server computer systems 202. For instance, the hosted services server computer systems 202 may automatically track various aspect of end user client interaction, including usage of the hosted services, frequency or recentness of making contact attempts, frequency, recentness and/or promptness in responding to contact attempts, and/or frequency or recentness of profile updating. Additionally, or alternatively, the information may, for example, include desired aspects, attributes, or characteristics desired in others by the end user client entity in order to form a relationship. Additionally, or alternatively, the information may, for example, include responses to surveys. In particular, the information may include responses to surveys provided by the hosted services server computer systems 202 to end user client entities that the hosted services server computer systems 202 deem to be successful (e.g., successful match or pairing, successful responses to messages, views of images and profile description by others, views or images or profile description that resulted in a contact attempt, a responded to contact attempt, or a face-to-face meeting). Surveys may, for instance, be provided to the end user client entity as part of terminating an account with the hosted service, and receipt of responses to the survey may optionally be a precondition to termination of the account.

The networked environment 200 may employ other computer systems and network equipment, for example, additional servers, proxy servers, firewalls, routers and/or bridges. The hosted services server computer systems 202 will at times be referred to in the singular herein, but this is not intended to limit the embodiments to a single device since in typical embodiments there may be more than one hosted services server computer systems 202 involved. Unless described otherwise, the construction and operation of the various blocks shown in FIG. 2 are of conventional design. As a result, such blocks need not be described in further detail herein, as they will be understood by those skilled in the relevant art.

The hosted services server computer systems 202 may include one or more processing units 212*a*, 212*b* (collectively 212), a system memory 214 and a system bus 216 that couples various system components, including the system memory 214 to the processing units 212. The processing units 212 may be any logic processing unit, such as one or more central processing units (CPUs) 212*a*, digital signal processors (DSPs) 212*b*, application-specific integrated circuits (ASICs), field programmable gate arrays (FPGAs), etc. The system bus 216 can employ any known bus structures or architectures, including a memory bus with memory controller, a peripheral bus, and/or a local bus. The system memory 214 includes read-only memory ("ROM") 218 and random access memory ("RAM") 220. A basic input/output system ("BIOS") 222, which can form part of the ROM 218, contains basic routines that help transfer information between elements within the hosted services server computer system(s) 202, such as during start-up.

The hosted services server computer systems 202 may include a hard disk drive 224 for reading from and writing to a hard disk 226, an optical disk drive 228 for reading from and writing to removable optical disks 232, and/or a magnetic disk drive 230 for reading from and writing to magnetic disks 234. The optical disk 232 can be a CD-ROM, while the magnetic disk 234 can be a magnetic floppy disk or diskette. The hard disk drive 224, optical disk drive 228 and magnetic disk drive 230 may communicate with the processing unit 212 via the system bus 216. The hard disk drive 224, optical disk drive 228 and magnetic disk drive 230 may include interfaces or controllers (not shown) coupled between such drives and the system bus 216, as is known by those skilled in the relevant art. The drives 224, 228 and 230, and their associated computer-readable media 226, 232, 234, provide nonvolatile storage of computer-readable instructions, data structures, program modules and other data for the hosted services server computer system 202. Although the depicted hosted services server computer systems 202 is illustrated employing a hard disk 224, optical disk 228 and magnetic disk 230, those skilled in the relevant art will appreciate that other types of computer-readable media that can store data accessible by a computer may be employed, such as WORM drives, RAID drives, magnetic cassettes, flash memory cards, digital video disks ("DVD"), Bernoulli cartridges, RAMs, ROMs, smart cards, etc.

Program modules can be stored in the system memory 214, such as an operating system 236, one or more application programs 238, other programs or modules 240 and program data 242. Application programs 238 may include instructions that cause the processor(s) 212 to receive and automatically store aspect, attribute or characteristic information about the end user client entities 104 (FIG. 1) to the associated nontransitory computer- or processor-readable storage medium 204. Application programs 238 may also include instructions that cause the processor(s) 212 to receive desired aspect, attribute or characteristic information for the end user client entities. Application programs 238 may also include instructions that cause the processor(s) 212 to automatically process the stored aspect, attribute or characteristic information and to compile said information into an evaluation criteria to compare to a component(s) of an evaluated end user client entity seeking relationships. Such is described in detail herein with reference to the various Figures.

The application programs 238 may include instructions that cause the processor(s) 212 to monitor end user client entity actions or activities, determine response characteristics based on such, and update discrepancy detection and prompting algorithms based on such. For instance, as explained below, the instructions may take into account whether an end user client entity is currently active (e.g., logged on), a frequency of being logged on, images and other information on a profile, duration of time spent logged on, frequency of responding to being messaged or approached, and/or an assessment of the popularity of the end user client entity (e.g., number or rate of messages).

The application programs 238 may further include instructions that cause the processor(s) 212 to identify comparative end user client entities who may have similar characteristics and/or similar desires to that of a particular end user entity and such may serve as proxy or evaluation criteria. The instructions may cause the processor(s) 212 to take into account the actions or activities of these comparative end user clients in generating prompts or suggestions for a particular end user client entity seeking to have a successful relationship.

The system memory 214 may also include communications programs, for example, a server 244 that causes the hosted services server computer system 202 to serve electronic information or files via the Internet, intranets, extranets, telecommunications networks, or other networks as described below. The server 244 in the depicted embodiment is markup language based, such as Hypertext Markup Language (HTML), Extensible Markup Language (XML) or Wireless Markup Language (WML), and operates with markup languages that use syntactically delimited characters added to the data of a document to represent the structure of the document. A number of suitable servers may be commercially available such as those from Mozilla, Google, Microsoft and Apple Computer.

While shown in FIG. 2 as being stored in the system memory 214, the operating system 236, application programs 238, other programs/modules 240, program data 242 and server 244 can be stored on the hard disk 226 of the hard disk drive 224, the optical disk 232 of the optical disk drive 228 and/or the magnetic disk 234 of the magnetic disk drive 230.

An operator can enter commands and information into the hosted services server computer system(s) 202 through input devices such as a touch screen or keyboard 246 and/or a pointing device such as a mouse 248, and/or via a graphical user interface. Other input devices can include a microphone, joystick, game pad, tablet, scanner, etc. These and other input devices are connected to one or more of the processing units 212 through an interface 250 such as a serial port interface that couples to the system bus 216, although other interfaces such as a parallel port, a game port or a wireless interface or a universal serial bus ("USB") can be used. A monitor 252 or other display device is coupled to the system bus 216 via a video interface 254, such as a video adapter. The hosted services server computer system(s) 202 can include other output devices, such as speakers, printers, etc.

The hosted services server computer systems 202 can operate in a networked environment 200 using logical connections to one or more remote computers and/or devices. For example, the hosted services server computer systems 202 can operate in a networked environment 200 using logical connections to one or more end user client processor-based systems 206. Communications may be via a wired and/or wireless network architecture, for instance, wired and wireless enterprise-wide computer networks, intranets, extranets, and/or the Internet. Other embodiments may include other types of communications networks including telecommunications networks, cellular networks, paging networks, and other mobile networks. There may be any variety of computers, switching devices, routers, bridges, firewalls and other devices in the communications paths between the hosted services server computer systems 202, the end user client processor-based systems 206.

The end user client processor-based systems 206 will typically take the form of end user processor-based devices, for instance, personal computers (e.g., desktop or laptop computers), net book computers, tablet computers, smart phones, personal digital assistants, workstation computers and/or mainframe computers, and the like, executing appropriate instructions. These end user client processor-based systems 206 may be communicatively coupled to one or more server computers. For instance, end user client processor-based systems 206 may be communicatively coupled externally via one or more end user client entity server computers (not shown), which may implement a firewall. The client entity server computers 206 may execute a set of server instructions to function as a server for a number of end user client processor-based systems 206 (i.e., clients) communicatively coupled via a LAN at a facility or site, and thus act as intermediaries between the end user client processor-based systems 206 and the hosted services server computer system(s) 202. The end user client processor-based systems 206 may execute a set of client instructions to function as a client of the server computer(s), which are communicatively coupled via a WAN.

The end user client processor-based systems 206 may include one or more processing units 268, system memories 269 and a system bus (not shown) that couples various system components including the system memory 269 to the processing unit 268. The end user client processor-based systems 206 will at times each be referred to in the singular herein, but this is not intended to limit the embodiments to a single end user client processor-based systems 206. In typical embodiments, there may be more than one end user client processor-based system 206 and there will likely be a large number of end user client processor-based systems 206.

The processing unit 268 may be any logic processing unit, such as one or more central processing units (CPUs), digital signal processors (DSPs), application-specific integrated circuits (ASICs), field programmable gate arrays (FPGAs), graphical processing units (GPUs), etc. Non-limiting examples of commercially available computer systems include, but are not limited to, an 80x86 or Pentium series microprocessor from Intel Corporation, U.S.A., a PowerPC microprocessor from IBM, a Sparc microprocessor from Sun Microsystems, Inc., a PA-RISC series microprocessor from Hewlett-Packard Company, a 68xxx series microprocessor from Motorola Corporation, an ATOM processor, or an A4 or A5 processor. Unless described otherwise, the construction and operation of the various blocks of the end user client processor-based systems 206 shown in FIG. 2 are of conventional design. As a result, such blocks need not be described in further detail herein, as they will be understood by those skilled in the relevant art.

The system bus can employ any known bus structures or architectures, including a memory bus with memory controller, a peripheral bus, and a local bus. The system memory 269 includes read-only memory ("ROM") 270 and random access memory ("RAM") 272. A basic input/output system ("BIOS") 271, which can form part of the ROM 270, contains basic routines that help transfer information between elements within the end user client computer systems 206, such as during start-up.

The end user client processor-based systems 206 may also include one or more media drives 273, e.g., a hard disk drive, magnetic disk drive, WORM drive, and/or optical disk drive, for reading from and writing to computer-readable storage media 274, e.g., hard disk, optical disks, and/or magnetic disks. The nontransitory computer-readable storage media 274 may, for example, take the form of removable media. For example, hard disks may take the form of a Winchester drive, and optical disks can take the form of CD-ROMs, while magnetic disks can take the form of magnetic floppy disks or diskettes. The media drive(s) 273 communicate with the processing unit 268 via one or more system buses. The media drives 273 may include interfaces or controllers (not shown) coupled between such drives and the system bus, as is known by those skilled in the relevant art. The media drives 273, and their associated nontransitory computer-readable storage media 274, provide nonvolatile storage of computer readable instructions, data structures, program modules and other data for the end user client processor-based systems 206. Although described as employing computer-readable storage media 274 such as hard disks, optical disks and magnetic disks, those skilled in the relevant art will appreciate that end user client processor-based systems 206 may employ other types of nontransitory computer-readable storage media that can store data accessible by a computer, such as magnetic cassettes, flash memory cards, digital video disks ("DVD"), Bernoulli cartridges, RAMs, ROMs, smart cards, etc. Data or information, for example, electronic or digital files or data or metadata related to such can be stored in the nontransitory computer-readable storage media 274.

Program modules, such as an operating system, one or more application programs, other programs or modules and program data, can be stored in the system memory 269. Program modules may include instructions for accessing a Website, extranet site or other site or services (e.g., Web services) and associated WebPages, other pages, screens or services hosted by the hosted services server computer system 114.

In particular, the system memory 269 may include communications programs that permit the end user client processor-based systems 206 to exchange electronic or digital information or files or data or metadata with the hosted services server computer system 202. The communications programs may, for example, be a Web client or browser that permits the end user client processor-based systems 206 to access and exchange information, files, data and/or metadata with sources such as Web sites of the Internet, corporate intranets, extranets, or other networks. Such may require that the end user client processor-based systems 206 have sufficient right, permission, privilege or authority for accessing a given Website, for example, one hosted by the hosted services sever computer system(s) 202. The browser may, for example, be markup language based, such as Hypertext Markup Language (HTML), Extensible Markup Language (XML) or Wireless Markup Language (WML), and may operate with markup languages that use syntactically delimited characters added to the data of a document to represent the structure of the document.

While described as being stored in the system memory 269, the operating system, application programs, other programs/modules, program data and/or browser can be stored on the computer-readable storage media 274 of the media drive(s) 273. An operator can enter commands and information into the end user client processor-based systems 206 via a user interface 275 through input devices such as a touch screen or keyboard 276 and/or a pointing device 277 such as a mouse. Other input devices can include a microphone, joystick, game pad, tablet, scanner, etc. These and other input devices are connected to the processing unit 269 through an interface such as a serial port interface that couples to the system bus, although other interfaces such as a parallel port, a game port or a wireless interface or a universal serial bus ("USB") can be used. A display or monitor 278 may be coupled to the system bus via a video interface, such as a video adapter. The end user client processor-based systems 206 can include other output devices, such as speakers, printers, etc.

Figure 3:
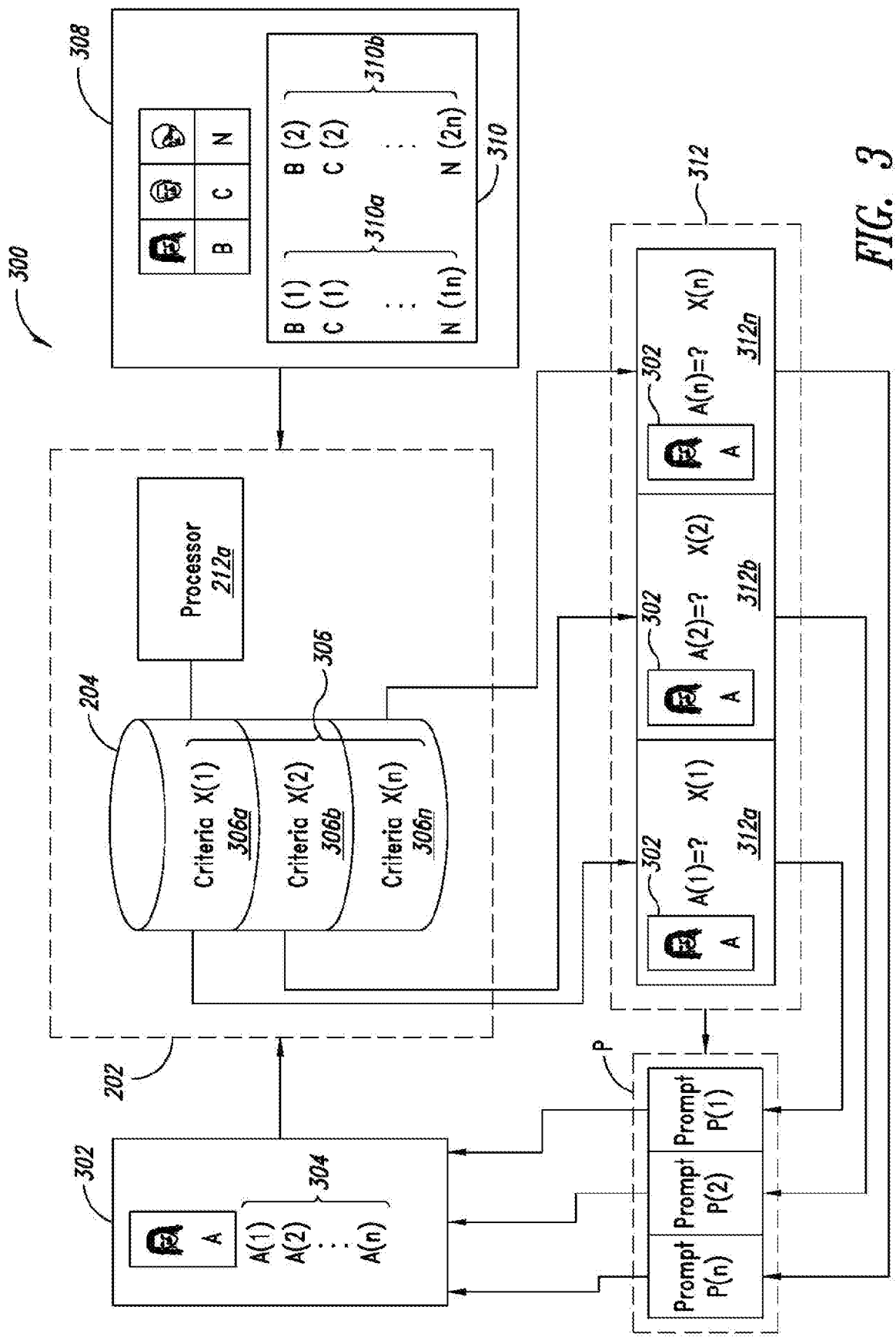
FIG. 3 is a schematic view of a networked processor-based environment to provide services to a particular user based on a set of defined criteria of a plurality of users, according to one illustrated embodiment.

FIG. 3 shows an example system 300 that includes a hosted services server computer systems 202 having a processor 212a and one or more associated nontransitory computer- or processor-readable storage media 204. In one example, the hosted services server computer systems 202 are configured to provide services to an end user 302. Those services may include identifying potential candidates or prospective matches for establishing a relationship with the end user 302. Those services may include review of at least one of a number of components 304 of an end user profile of the end user 302 relative to at least one of a set of defined evaluation criteria 306 for at least some of those components 304, and identification and possibly evaluation of discrepancies therebetween. Those services may additionally or alternatively include review of actions or activities by the end user 302 relative to at least one of a set of defined evaluation criteria 306 for at least some of those actions or activities, and identification and possibly evaluation of discrepancies therebetween. The defined evaluation criteria may represent characteristics of various end user profile components, for instance frequency, recentness, promptness, length, and/or number of various components or updates of such components. The defined evaluation criteria may represent activities or actions by other end users, for example other end users considered or classified as successful (e.g., having at least a defined level of positive activity or interactions with other end users). The other end users may be selected to share certain characteristics or traits with the end user that is being subjected to the evaluations. Those characteristics or traits may, for example include similar or identical biographic information, similar or identical desired traits in other end users, and/or similar or identical geographic location. Those services may further include, in response to detecting at least one discrepancy 308 between the components 304 of the end user 302 and the set of defined evaluation criteria 306, the hosted services server computer systems 202 causes at least one prompt P to be provided to the end user 302 indicative of the discrepancy.

In practice and by way of an example, the hosted services server computer systems 202 may identify successful end user entities, and then compare at least one component of the end user with a set of defined evaluation criteria derived from components of the successful end users. In some implementations, the hosted services server computer systems 202 may identify as successful end user entities, end user entities that are not only categorized or classified as successful, but that also share the same or similar components (e.g., attributes, characteristics, behavior, activities, constraints or desired traits, geographic location) as the end user being evaluated. Based on the results of such comparative information and if a discrepancy exists, the hosted services server computer systems 202 causes a prompt (e.g., an indicator, suggestion, message, notification, display) to the end user so that the end user may change and/or update certain components of the end user's profile and/or change actions or activities (e.g., increase frequency of updating) that may be hindering success, for instance hindering the chances of obtaining a successful relationship. For instance, updating a end user profile, adding photographs, and/or modifying attempted contact actions such as messaging behavior, based on the prompt.

More particularly, the hosted services server computer systems 202 may identify successful end users 308B-308N (collectively "successful end users 308"), having the same or similar components of an end user 302, and store information on the storage medium 204 indicative of one or more components 310 (310a and 310b). The assumption is that the successful end users 308 have a relatively high number of positive interactions with other end users, which may or may not have resulted in successful relationships, because of at least some of the components 310 of the end user profile and/or end user actions or activities. Thus, at least one evaluation criteria 306 may be established as a proxy to compare against at least one component 304 of the respective end user profile and/or action or activity by the end user 302.

Each end user 308 classified as successful may be one of the end user client entities 104 discussed with reference to FIG. 1. The one or more components 310 of the end user profiles of the successful end users 308 may be any number of components, including but not limited to, information pertaining to attributes, constraints, characteristics, messages, views, reviews, images, frequencies, and the like. For example, components 310a may include a component B(1) that includes information that a successful end user B has posted 5 images on his profile, and a component C(1) may include information that a successful end user C has posted 3 images on his profile, and so on for any number of users N having components N(1n) in which each end user identified has at least 3 images in their respective profiles. In addition, components 310b may include a component B(2) that includes information that a successful end user B has a profile description that is 1729 characters, and a component C(2) may include information that successful end user C has a profile description that is 508 characters, and so on for any number of users N having components N(2n) in which each end user N identified has a profile description of between 500 and 1000 characters.

The hosted services server computer systems 202 may store the information pertaining to components 310a and components 310b in the storage medium 204 as a set of defined evaluation criteria 306 to review and/or compare 312 the number of components 304 of the end user 302 relative to the set of defined evaluation criteria 306. For instance, a single defined evaluation criteria 306a may be indicative of an evaluation criteria X(1), which is a threshold that successful end users have at least 3 images posted on their profiles. Accordingly, the hosted services server computer systems 202 compares 312a component A(1) of the end user 302 with evaluation criteria X(1). The hosted services server computer systems 202 determines whether A(1)=X(1). If A(1)=X(1), the end user A has at least 3 images on his profile and nothing further is done in this respect. If A(1)≠X(1), then the hosted services server computer systems 202 has detected a discrepancy because the end user 304 has less than 3 images on his profile. This discrepancy indicates that the end user 304 may not have enough images on his profile in order to obtain generate interest from other end users. As a result of detecting the discrepancy, the hosted services server computer systems 202 is configured to send a prompt P(1) to the end user 304 to indicate the existence of such discrepancy. For instance, end user 304 may receive a message generated from the hosted services server computer systems 202 that indicates: Statistics show that you will likely receive more responses from other users if you have at least 3 images on your profile. Add more images now here!

Similarly, a single defined evaluation criteria 306b may be indicative of an evaluation criteria X(2), which includes threshold range information that successful users have a profile description between 500 and 1000 characters. Accordingly, the hosted services server computer systems 202 compares 312b component A(2) of the end user 302 with evaluation criteria X(2). The hosted services server computer systems 202 determines whether A(2)=X(2). If A(2)=X(2), then the end user A has a profile description of at least 500 characters and nothing further is done in this respect. If A(2)≠X(2), then the hosted services server computer systems 202 has detected such discrepancy because the end user 304 has a profile description of less than 500 characters or more than 1000 characters. This discrepancy indicates, for example, that the end user 304 may not have enough information, or has too much information, on his profile in order to obtain a successful relationship. As a result of detecting the discrepancy, the hosted services server computer systems 202 is configured to send a prompt P(2) to the end user 304 to indicate the existence of such discrepancy as compared to successful end users 308. The prompt P(2) may provide a solution to the end user to correct the discrepancy. The same holds true for any number of criteria X(n) as compared to any number of components A(n) of the end user 302. If a discrepancy is detected between evaluation criteria X(n) and component(s) A(n), a prompt P(n) is provided to end user 304. As further discussed above, the prompt may even be a meter or other indicator displayed on an application viewable by the end user 302 that is indicative of the relationship health or success of the end user 302. If the end user 302 changes or updates components to correct the discrepancy, the meter or other indicator may change to reflect such changes by the end user 302.

Advantageously, criteria X(n) may include of a plurality of evaluation criteria pertaining to a plurality of components of end user profiles for successful end users relative to a plurality of components a particular end user. For example, the hosted services server computer systems 202 may identify that the end user 204 is a 45 year old male with 4 children; has 2 images on his end user profile dated from his senior year in College; resides in Seattle and is looking for a long term relationship; and messages end users primarily in Portland ("components M"). The hosted services server computer systems 202 may identify and store information from successful end users 308 having at least some or the same components as components A(3-9). For instance, the hosted services server computer systems 202 may only identify successful end users 308 that are between 40-50 years old with 1-4 child(ren), living within 50 miles of Seattle, looking for a long term relationship. Again, success may be evaluated on a variety of criteria, for instance the number or percentage of potential candidates or matches generated, the number or frequency that an end user profile is viewed, a length of time that other end users linger on an end user profile, a total number or frequency of contact attempts received, a total number or frequency of responses to contact attempts, a total number or frequency of face-to-face encounters which result from contact attempts, and/or entry into a relationship that matches a stated desired type of relationship.

Based on at least some of the components of the successful end users 308, the hosted services server computer systems 202 causes a generated evaluation criteria ("criteria X(M)") to be stored. As previously noted, evaluation criteria may not only specific evaluation criteria for evaluating an end user profile, but may also specify criteria for evaluating various end user actions or activities, for instance contact attempts and responding to contact attempts. The hosted services server computer systems 202 may compare, individually and/or collectively, criteria X(M) with components A(M) and determine that discrepancies exist, as further discussed above. Once such discrepancies are determined and identified, the hosted services server computer systems 202 will prompt the end user 204 accordingly. For example, the prompt may inform the end user 204 that successful end users 308 have at least 3 images on their profiles; have recent images on their profiles; and only message other end users living within 10 miles of Seattle. Thus, the end user 204 may update his profile and/or messaging behavior based upon the prompted discrepancies determined by the hosted services server computer systems 202. As illustrated in this example, criteria X(n) may be based, at least partially, on successful end users 308 sharing demographic information with end user 302, such as men seeking women between ages 40-50, having at least one child, and living in Washington.

In some embodiments, criteria X(n) may be at least partially based upon components that were not derived from identified successful end users. The hosted services server computer systems 202 may store criteria X(n) on the storage medium 204 that pertains to information that certain end user behaviors or activities do not result in a successful relationship with another end users based on common knowledge and/or data gathered from other non-end user sources and/or from unsuccessful end user components. For example, if a user has indicated that he is only looking for a long term relationship but he only messages users looking for short term dating or casual encounters, the hosted services server computer systems 202 may identify the discrepancy based on the user's messaging activities as compared to the information on the user's profile. In such a situation, the end user's stated intent does not match the end user's own actions or activities. Based on the identification of such discrepancy, the hosted services server computer systems 202 may cause a prompt P(n) to the user indicative of said discrepancy. The prompt P(n) may include a suggestion to the user pertaining to the user's behavior as contrasting the user's profile information.

Figure 4:
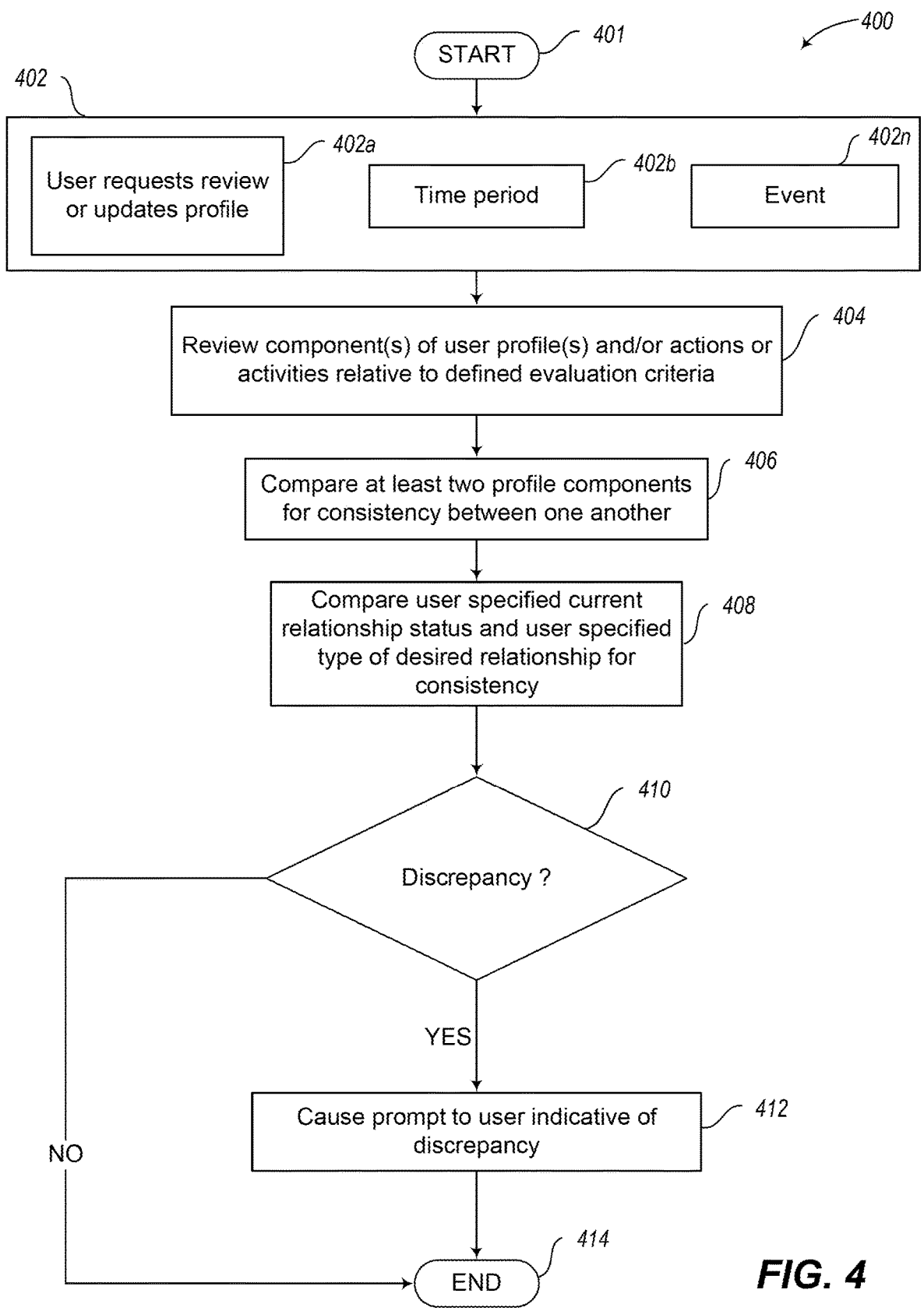
FIG. 4 is a flow diagram showing a high level method of operation of providing services to a particular user based on a set of defined criteria of a plurality of users, according to one illustrated embodiment.

FIG. 4 shows a high level method 400 of operating a hosted services server computer systems 202 to provide hosted services, and in particular to compare information (e.g., end user profile information, end user actions or activities) about a given end user with evaluation criteria, and to prompt the given end user (denominated as evaluated end user) in the event of a detected discrepancy, according to one illustrated embodiment.

The hosted services method 400 starts at 402. For example, the hosted services method 400 may start on powering up of a component or device of the hosted services server computer systems 202. Alternatively, the hosted services method 400 may start in response to a launching of an application by an end user client entity, or in response to a call from a calling routine executing on an end user client processor-based system 110.

At 402, a trigger action occurs. The triggering action may take any of a large variety of forms. For example, hosted services server computer systems 202 may receive a request from a user for updating a respective end user profile 402a. Alternatively, the triggering action may take the form of passage of a time period 402b. Also for example, the triggering action may take the form of an occurrence of some other event 402n. The trigger action 402n may be any number or combination of numbers of the above. For instance, if a user is repeatedly unsuccessful (e.g., receives too few contact requests, end user profile viewed too few times) for a defined period of time, the hosted services server computer systems 202 may automatically perform the operations shown in some or all of the methods discussed with reference to the Figures. Furthermore, if a user updates their user profile, for instance by reducing images to only one image, the hosted services server computer systems 202 may automatically review the components of the user profile as compared to evaluation criteria derived from other end users, for instance other end users who are categorized or classified as successful (e.g., relatively high level of interaction with other end users).

At 404, for each of a number of users, the hosted services server computer systems 202 reviews a number of components of the respective user profile and/or characterizations of end user actions or activities for the respective end user relative to a set of defined evaluation criteria that specifies defined evaluation criteria for at least some of those components and/or end user actions or activities, to determine if there are discrepancies therebetween.

At 406, the hosted services server computer systems 202 compares at least two profile components for consistency between one another to determine if there is are discrepancies therebetween.

At 408, the hosted services server computer systems 202 compares a user specified current relationship status and a user specified type of desired relationship to determine if there are discrepancies therebetween. Of course, 406 and 408 are optional and could be omitted.

At 410, a decision is made by the hosted services server computer systems 202 as to whether there is at least one discrepancy. In particular, the hosted services server computer systems 202 determine whether there are any discrepancies between the components of the respective user profile and the set of defined evaluation criteria. The hosted services server computer systems 202 determines whether there are any discrepancies between end user actions or activities and the set of defined evaluation criteria, between. The hosted services server computer systems 202 may determine whether there are any discrepancies between two or more different components of the respective end user profile. The hosted services server computer systems 202 may determine whether there are any discrepancies between an indicated intent of the end user and the end user's actions or activities. For example, the hosted services server computer systems 202 may determine whether there are any discrepancies between a current relationship status specified by the end user and a type of directed relationship specified by the end user. The hosted services server computer systems 202 may make other similar determinations. For example, the hosted services server computer systems 202 may determine whether the end user profiles the end user views or the other end users that the end user attempts to contact or reply to are inconsistent with a stated intent. For example, if the end user specifies a desired for a long term relationship, but views end user profiles or attempts to contact other end users who specify short term relationships, the hosted services server computer systems 202 may identify such as a discrepancy.

If a discrepancy is found, the hosted services server computer systems 202 causes a prompt to be provided to the user indicative of the discrepancy at 412. The hosted services server computer systems 202 may evaluate the discrepancies before determining whether or not to cause the prompt at 412. For example, the hosted services server computer systems 202 may determine whether one or more identified discrepancies are sufficiently severe, for example critical discrepancies. Also for example, the hosted services server computer systems 202 may evaluate how many discrepancies are identified.

The hosted services server computer systems 202 may send a command or instructions to an end user device to cause the prompt. The prompt may be a visible prompt, for example text, highlight, visual emphasis or even a presentations such as video type tutorial. The prompt may additionally or alternatively include an aural prompt, for example recorded or machine generated spoken instructions.

The method 400 terminates at 414, for example until executed again, for instance in response to a calling routine. Alternatively, the method 400 may continuously or periodically repeat.

Figure 5:
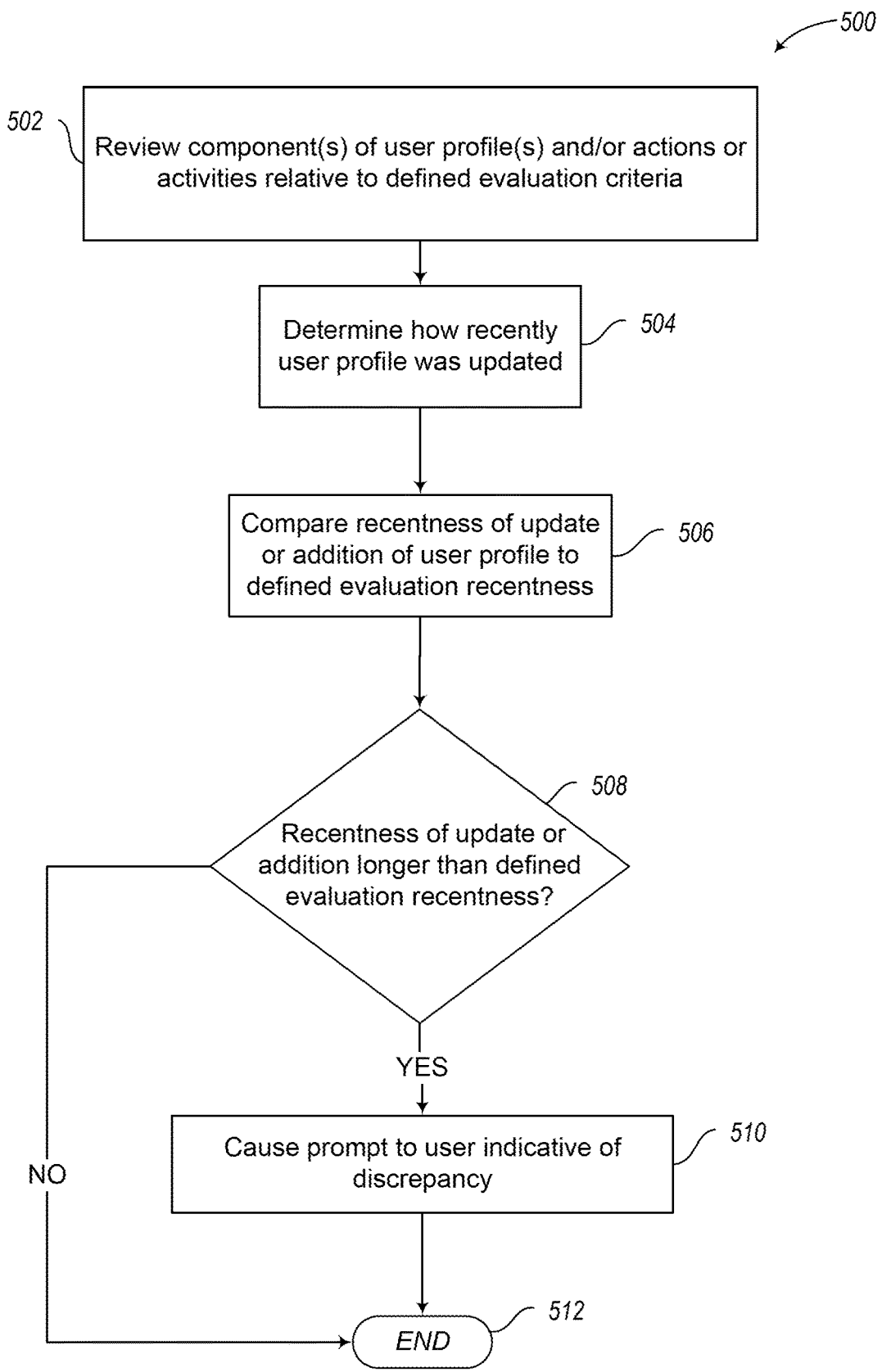
FIGS. 5-15 are flow diagrams showing methods of operation of providing services to a particular user based on a set of defined criteria of a plurality of users, according to illustrated embodiments.

FIG. 5 shows a method 500 of operating a hosted services server computer systems 202, according to one illustrated embodiment. The method 500 may be employed in implementing some or all of the method 400 (FIG. 4). At 502, for each of a number of users, the hosted services server computer systems 202 reviews a number of components of the respective user profile for the user relative to a set of defined evaluation criteria that specifies defined evaluation criteria for at least some of those components. The hosted services server computer systems 202 may also review a number of end user actions or activities by the end user relative to a set of defined evaluation criteria that specifies defined evaluation criteria. End user actions or activities may take a large variety of forms. For example, end user activities may include how often or frequently an end user accesses the hosted services. End user activities may include how often or frequently an end user attempts to contact another end user. End user activities may include how often or frequently an end user replies or responds to contact attempts originated from other end users. The hosted services server computer systems 202 may also review a consistency between components of the end user profile. The hosted services server computer systems 202 may also review a consistency between a stated end user intent and various components of the respective end user profile and/or actions or activities of the end user.

At 504, the hosted services server computer systems 202 determines how recently the respective user profile was updated. At 506, the hosted services server computer systems 202 compares a recentness of the update or addition of the respective user profile to a defined evaluation recentness and then proceeds to 508. Many end users are attracted to new or recently added end user profiles, and including recent pictures or photographs. Stale end user profiles are often passed over. At 508, the hosted services server computer systems 202 identifies a discrepancy if the recentness of the update of the respective user profile is longer than the defined evaluation recentness. If a discrepancy exists, at 510 the hosted services server computer systems 202 causes a prompt to be provided to the user indicative of the discrepancy then ends at 512. If no discrepancy exists, the method 500 ends at 512.

Figure 6:
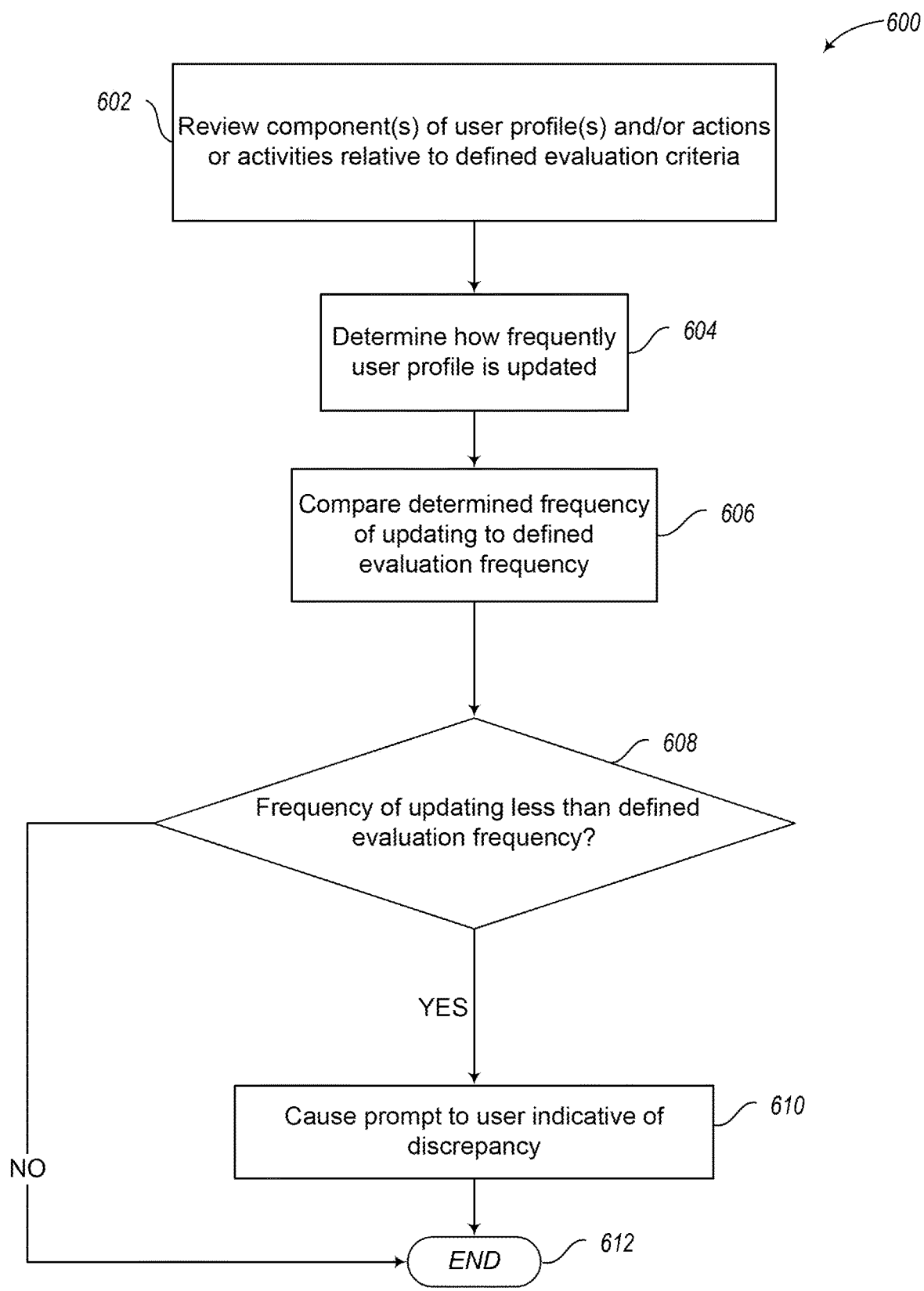

FIG. 6 shows a method 600 of operating a hosted services server computer systems 202, according to one illustrated embodiment. The method 600 may be employed in implementing some of all of the method 400 (FIG. 4). At 602, for each of a number of users, the hosted services server computer systems 202 reviews a number of components of the respective user profile for the user relative to a set of defined evaluation criteria that specifies defined evaluation criteria for at least some of those components. The hosted services server computer systems 202 may also review a number of end user actions or activities by the end user relative to a set of defined evaluation criteria that specifies defined evaluation criteria. At 604, the hosted services server computer systems 202 determines how frequently the respective user profile is updated and then proceeds to 606. Many end users are attracted to recently updated end user profiles, and including recently updated pictures or photographs. Stale end user profiles are often passed by. At 606, the hosted services server computer systems 202 compares the determined frequency of the updating of the respective user profile to a defined evaluation frequency and then proceeds to 608. At 608, the hosted services server computer systems 202 identifies a discrepancy if the frequency of the updating of the respective user profile is less than the defined evaluation frequency. If a discrepancy exists, at 610 the hosted services server computer systems 202 causes a prompt to be provided to the user indicative of the discrepancy and then ends at 612. If no discrepancy exists, the process ends at 612.

Figure 7:
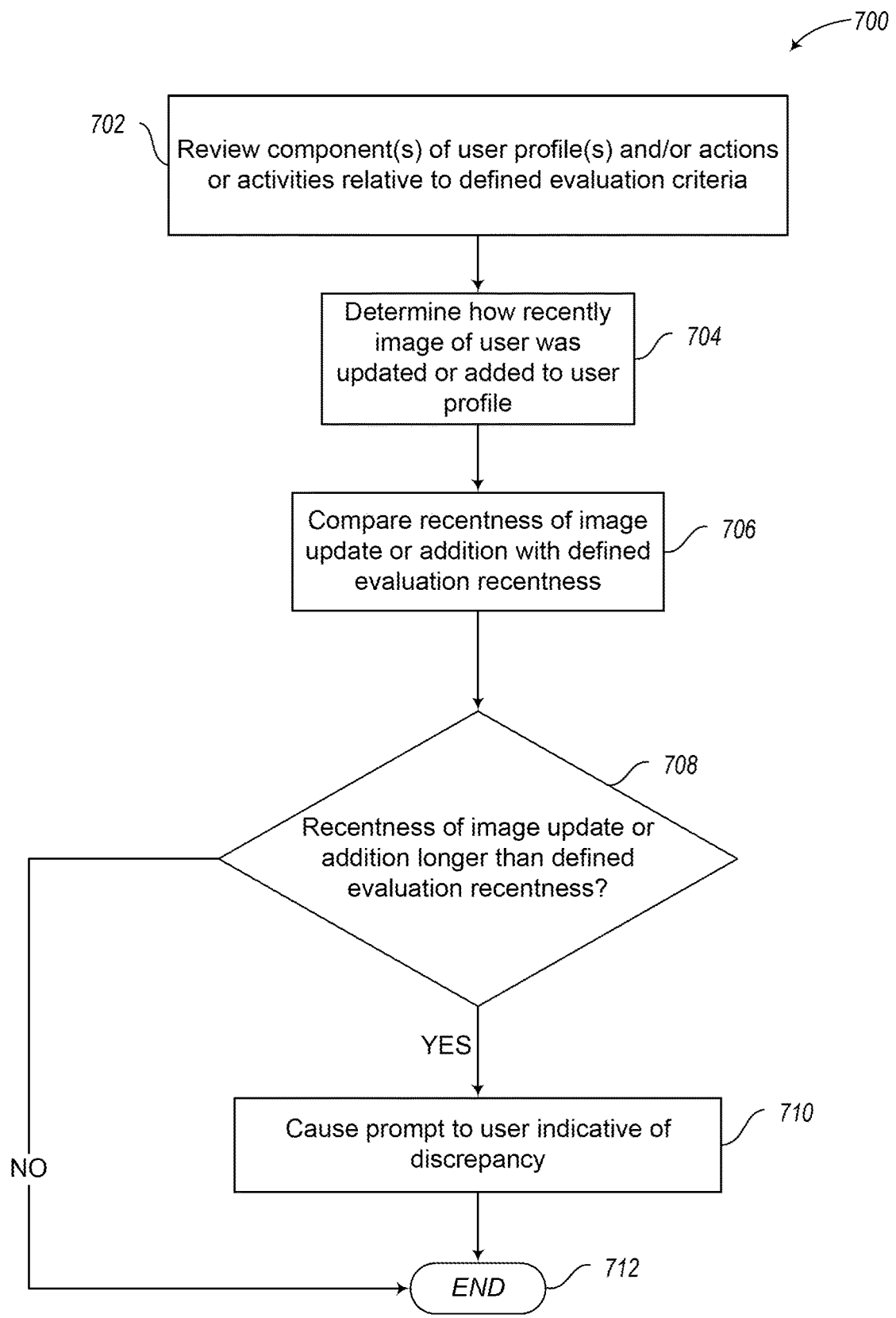

FIG. 7 shows a method 700 of operating a hosted services server computer systems 202, according to one illustrated embodiment. The method 700 may be employed in implementing some or all of the method 400 (FIG. 4). At 702, for each of a number of users, the hosted services server computer systems 202 reviews a number of components of the respective user profile for the user relative to a set of defined evaluation criteria that specifies defined evaluation criteria for at least some of those components. The hosted services server computer systems 202 may also review a number of end user actions or activities by the end user relative to a set of defined evaluation criteria that specifies defined evaluation criteria. At 704, the hosted services server computer systems 202 determines how recently an image of the user was updated or added to the respective user profile. Many end users are attracted to new or recently added pictures or photographs. Stale pictures or photographs are often passed over. At 706, the hosted services server computer systems 202 compares a recentness of the image update or addition with a defined evaluation recentness and then proceeds to 708. At 708, the hosted services server computer systems 202 identifies a discrepancy if the recentness of the image update or addition is longer than the defined evaluation recentness and then proceeds to 410. If a discrepancy exists, at 710 the hosted services server computer systems 202 causes a prompt to be provided to the user indicative of the discrepancy at and then ends at 712. If no discrepancy exists, the process ends at 712.

Figure 8:
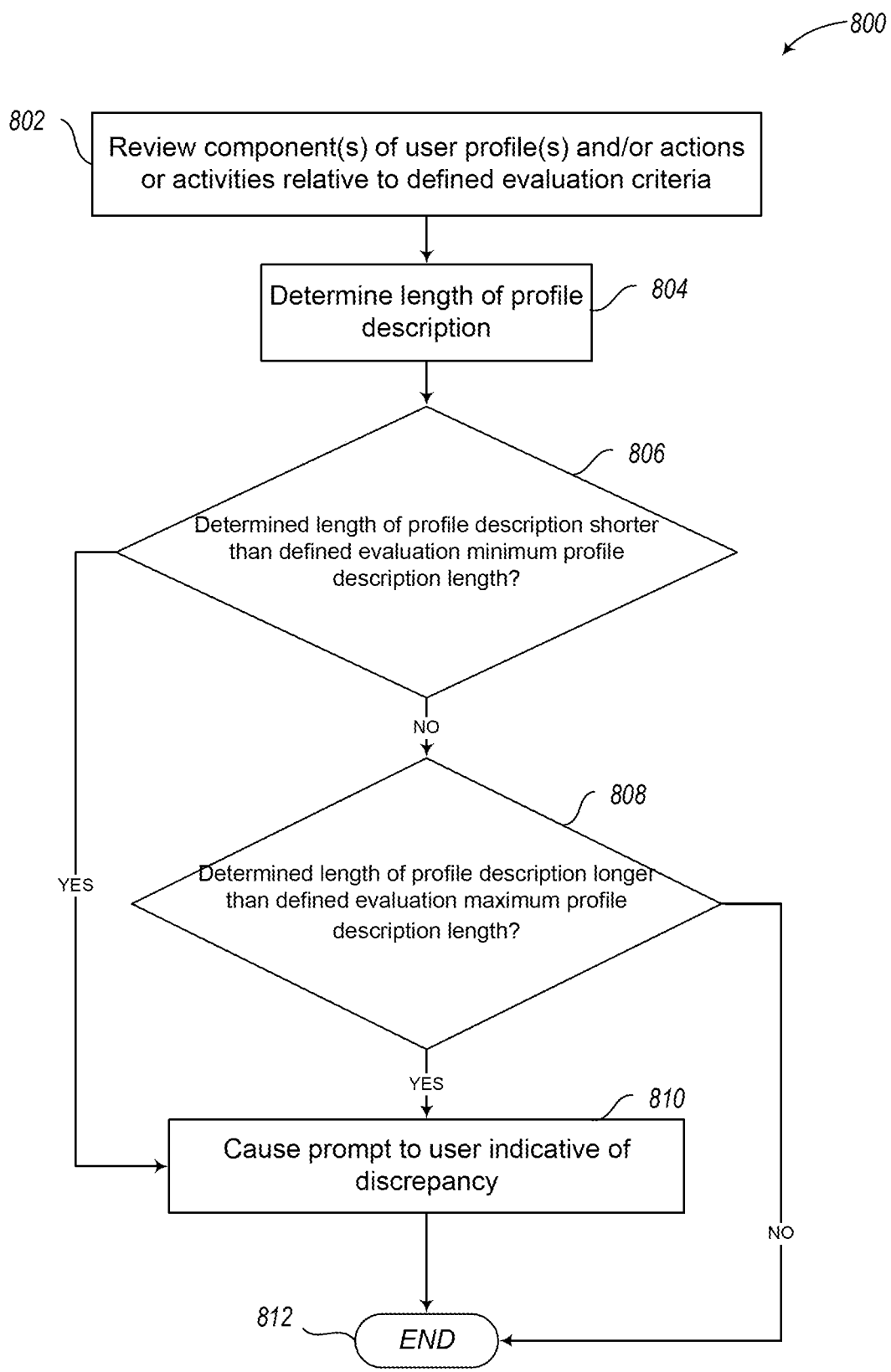

FIG. 8 shows a method 800 of operating a hosted services server computer systems 202, according to one illustrated embodiment. The method 800 may be employed in implementing some or all of the method 400 (FIG. 4). At 802, for each of a number of users the hosted services server computer systems 202 reviews a number of components of the respective user profile for the user relative to a set of defined evaluation criteria that specifies defined evaluation criteria for at least some of those components. The hosted services server computer systems 202 may also review a number of end user actions or activities by the end user relative to a set of defined evaluation criteria that specifies defined evaluation criteria. At 804, the hosted services server computer systems 202 determines a length of a profile description. It has been observed that descriptions that are too brief may be ignored or passed over by other end users. Similarly, descriptions that are too long also tend to be ignored or passed over by other end users. The same concept may apply to other text fields, for instance contact attempts or messages and/or replies or responses to contact attempts or message. For At 806, the hosted services server computer systems 202 identifies a discrepancy if the determined length of the profile description is shorter than a defined evaluation minimum profile description length. If a discrepancy exists, at 810 the hosted services server computer systems 202 causes a prompt to be provided to the user indicative of the discrepancy and the method 800 ends at 812. Otherwise at 808, the hosted services server computer systems 202 identifies a discrepancy if the determined length of the profile description is greater than a defined evaluation maximum profile description length. If a discrepancy exists, at 810 the hosted services server computer systems 202 causes a prompt to be provided to the user indicative of the discrepancy and then ends at 812. If no discrepancy exists, the method 800 ends at 812. While described in terms of profile description, the same approach may be employed for other fields of text, for instance message length of contact attempts and/or replies or responses to contact attempts.

Figure 9A:
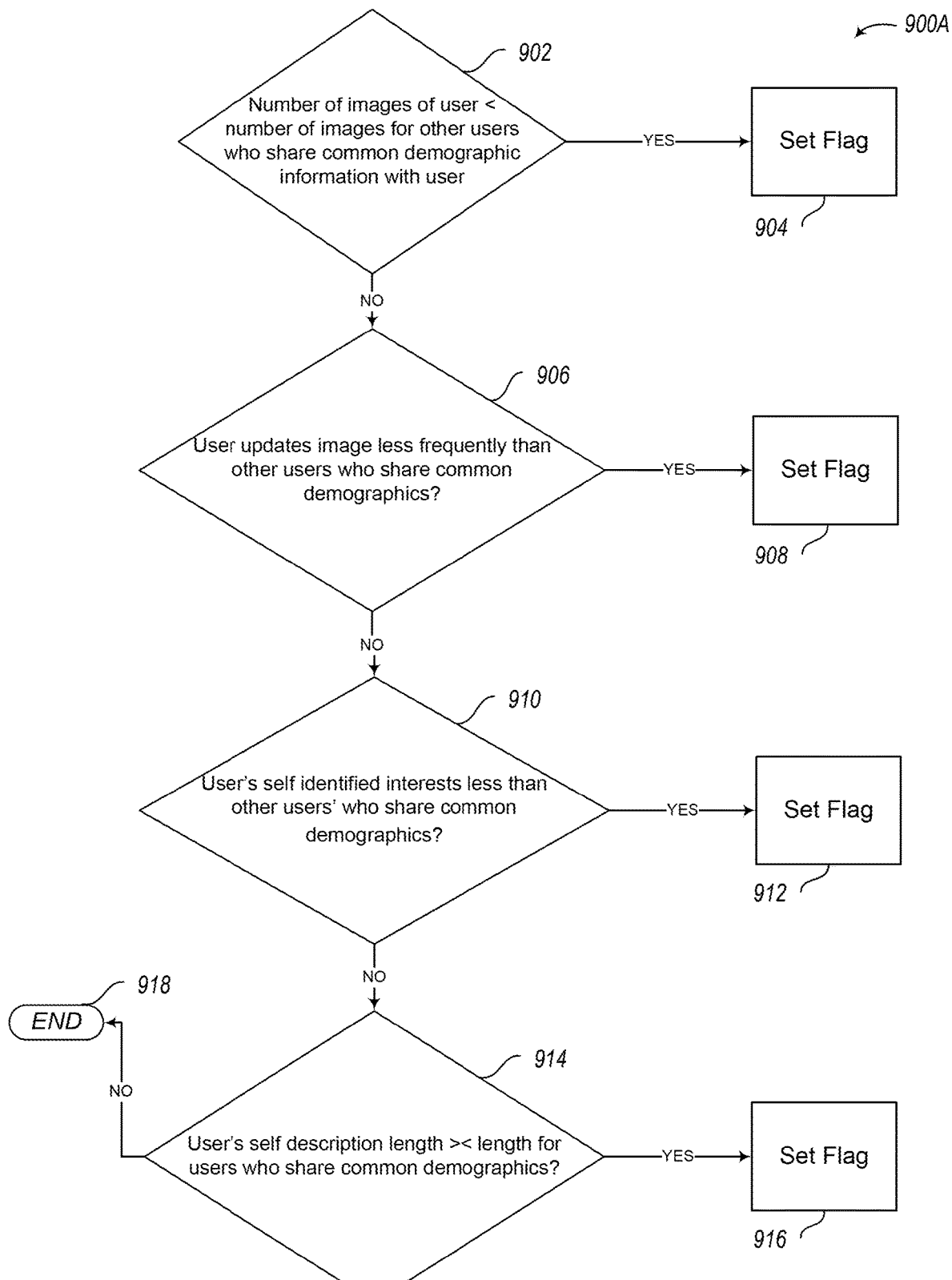

FIG. 9A shows a method 900A of operating a hosted services server computer systems 202, according to one illustrated embodiment. The method 900A may be employed, for example, in executing that various acts 402 (FIG. 4), 502 (FIG. 5), 602 (FIG. 6), 702 (FIG. 7), and/or 802 (FIG. 8). At 902, the hosted services server computer systems 202 compares a total number of images of the user (e.g., photographs or pictures of the user's own self) to a total number of images for a set of other ones of the users.

The other ones of the end users preferably share at least some demographic information in common with the user. The demographic information may take the form of conventional demographic information including age, height, weight, body type, hair color, eye color, race, religion, marital status, income, education level, etc. Demographic information may also include hobbies, alcohol, tobacco and/or illicit drug use. Demographic information may even include information such as likes and dislikes, type of relationship sought, and/or attributes or characteristics sought in others.

The other ones of the end users may be a subset of all end users, selected for example based at least in part on at least one indicator of success. For example, the subset of end users may be those who receive at least a defined number of inquiries in a defined time period, who respond or reply to at least a defined number of inquiries in a defined time period, and/or who have a defined number of face-to-face meetings in a defined period. Additionally or alternatively the subset of end users may be those who have had their end user profiles viewed a defined number of times in a defined period, and/or those who have had their end user profiles or photographs lingered over for a defined length of time by each of a defined number of other users in a defined period. Other indications of success may be employed, such indications typically demonstrating a relatively high degree of interaction with other end users.

Certain end users may be intentionally omitted or eliminated from the subset. For example, end users with aggressive or suspicious patterns of behavior may be excluded or segregated from the subset. The hosted services server computer systems 202 may review components of end user profiles as well as end user actions and activities, evaluating for which one clearly fall outside of a mean or acceptable range. Falling outside the mean or acceptable range may indicate and end user who is attempting to cheat or scam other end users. Users who may be found to cheat or scam other users may have their profiles removed from the hosted services computer system 202. Hosted services computer system 202 may ban users who may be found to cheat or scam other users from creating new profiles on from the hosted services computer system 202.

If the number of images for the user are less than what a sample set of end users have, a discrepancy flag is set at 904.

At 906, the hosted services server computer systems 202 compares how often the user updates images of the user to how often a set of other ones of the users who share common demographic information with the user update respective images. As previously noted, frequent updating tends to attract more interest than stale images, photographs or pictures. If the user updates images less frequently, at 908 a discrepancy flag is set.

At 906, the hosted services server computer systems 202 compares a total number of self identified interests of the user to a total number of self identified interests for a set of other ones of the users who share common demographic information with the user. Too few identified interests tend to generate minimal if any interest by other end users. In contrast, too many identified interest may also cause other end users to pass over a profile. If the total number of self identified interests of the user is less, at 908 a flag is set.

At 914, the hosted services server computer systems 202 compares a length of self description of the user to a length of a self description for a set of other ones of the users who share common demographic information with the user. As previously noted, there is typically a correlation between length of self description and interest of other end users. Too short or too long a narrative may cause other users to pass over the end user profile. If the length of self description of the user is less than a minimum length of a self description, at 916 is a discrepancy flag is set. If the length of self description of the user is greater than a maximum length of a self description, at 916 a discrepancy flag is set. If the length of self description of the user is within a predefined range of a length of self description, the process ends at 918.

Figure 9B:
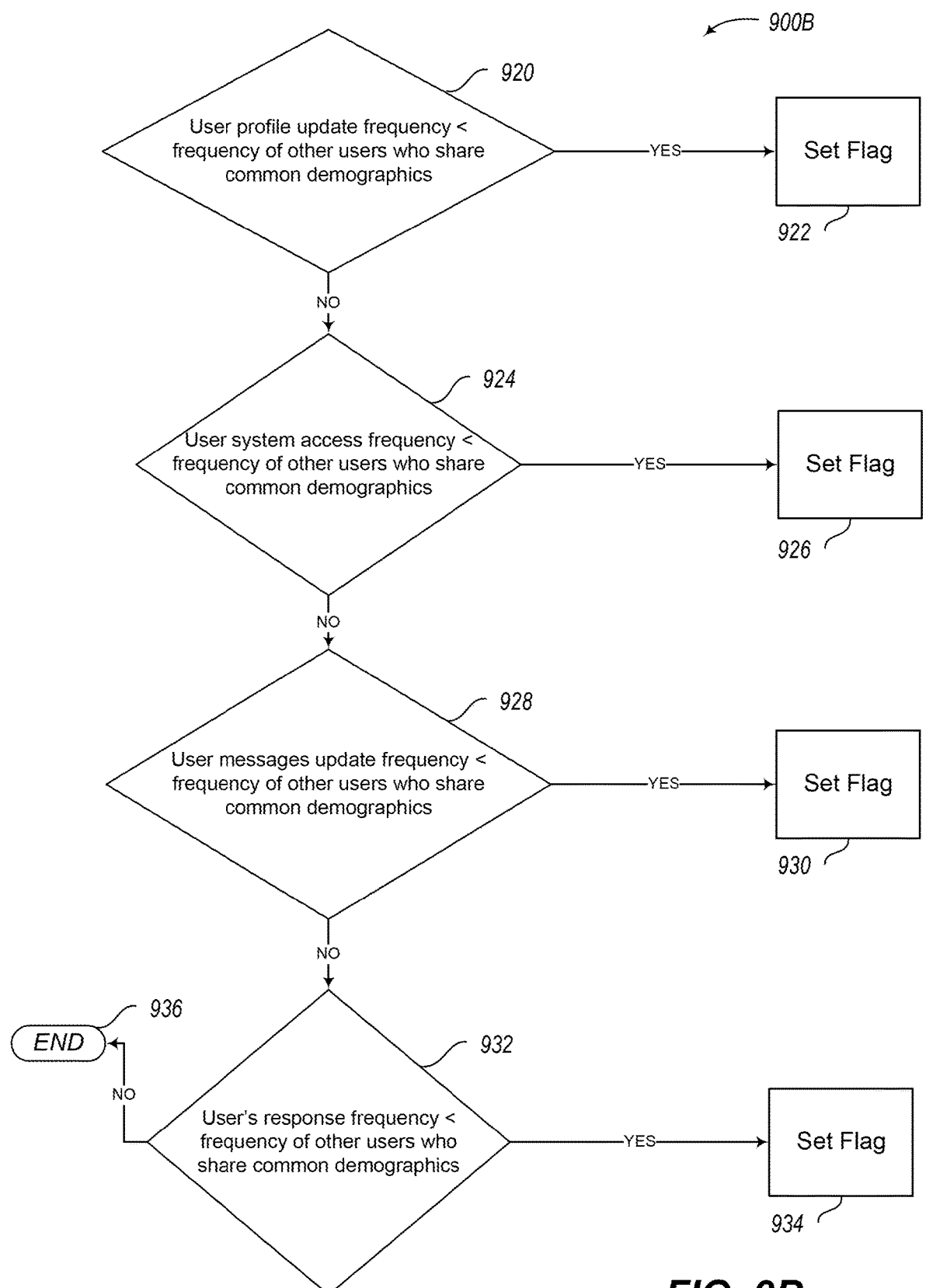

FIG. 9B shows a method 900B of operating a hosted services server computer systems 202, according to one illustrated embodiment. The method 900B may, for example, be employed in executing one or more of the acts 402 (FIG. 4), 502 (FIG. 5), 602 (FIG. 6), 702 (FIG. 7), and/or 802 (FIG. 8). The method 9B may be executed immediately following, or immediately preceding the method 900A. In some implementations, the acts of the methods 900B and 900A may be interleaved. Some acts may be omitted, while other acts may be added. The various acts may be performed or executed in a different order than shown.

At 920, the hosted services server computer systems 202 compares how frequently the user updates the respective user profile to how frequently a set of other ones of the users who share common demographic information with the user update the respective user profiles. Stale end user profiles tend to be passed over, while recently updated or fresh end user profiles tend to garner more interest. For example, weekly updates may be considered the goal, while longer periods of time between updates may be discouraged. If the user updates the profile less frequently, at 922 a discrepancy flag is set.

At 924, the hosted services server computer systems 202 compares how frequently the user accesses the processor-based hosted services system to how frequently a set of other ones of the users who share common demographic information with the user access the processor-based hosted services system. Active of frequent use of the hosted services system tends to correlate with higher interest from other end users. If the user accesses the system less frequently, at 926 a discrepancy flag is set.

At 928, the hosted services server computer systems 202 compares how frequently the user sends messages to other users to how frequently a set of other ones of the users who share common demographic information with the user send messages to other users. Attempts to contact other end users or messaging tends to correlate strongly with attention paid by other end users or success. If the user sends messages less frequently, at 930 a discrepancy flag is set.

At 928, the hosted services server computer systems 202 compares how frequently the user responds to messages from other users to how frequently a set of other ones of the users who share common demographic information with the user respond to messages from other users. Actively and promptly responding or replying by the end user to attempts to contact the end user by other end users also correlates strongly with continued attention paid by other end users or success. If the user responds to messages less frequently, at 934 a discrepancy flag is set. If the user responds to messages more frequently, the process ends at 936.

Figure 9C:
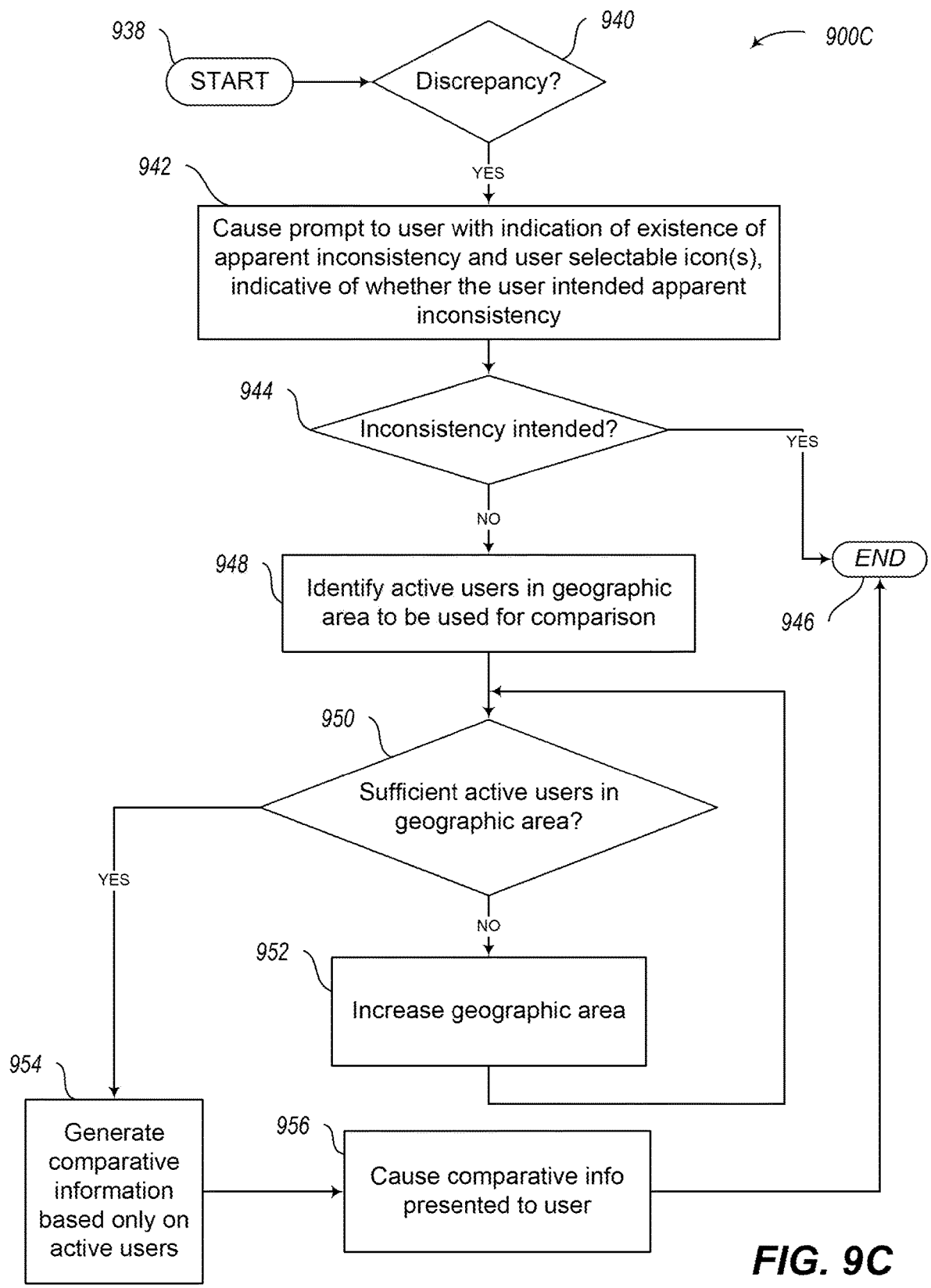

FIG. 9C shows a method 900C of operating a hosted services server computer systems 202, according to one illustrated embodiment. The method 900C may, for example, follow the methods 900A (FIG. 9A) and/or 900B (FIG. 9B).

The method 900 starts at 938, for example in response to a call from a calling routine. At 940, the hosted services server computer systems 202 identifies whether a discrepancy was identified or found. The hosted services server computer systems 202 may, for example, check a set of discrepancy flags, which may have been set in the methods 900A (FIG. 9A) and/or 900B (FIG. 9B). Additionally or alternatively, the hosted services server computer systems 202 may be executing any one or more of acts 410 (FIG. 4), 508 (FIG. 5), 608 (FIG. 6), 708 (FIG. 7), and 806 (FIG. 8) The set of discrepancy flags may, for instance be stored as a word, each bit representing a flag or status for a respective discrepancy type. As previously explained, the hosted services server computer systems 202 may check for a severity level of the discrepancy and/or total number of discrepancies in evaluating the discrepancies and 1) determining whether to provide a prompt to the end user, and 2) what type of prompt should be provided to the end user.

If a discrepancy exists, at 942 the hosted services server computer systems 202 causes a prompt to be provided to the user and cause a presentation of at least an indication of an existence of an apparent inconsistency. The prompt may include at least one or more user selectable icons, selection of which is indicative of whether the user intended the apparent inconsistency. At 944, the hosted services server computer systems 202 determines whether the discrepancy or inconsistency was or is intended. If the discrepancy or inconsistency is determined to have been intended, the method 900C ends at 946. If the discrepancy or inconsistency is determined to have been unintentional, the hosted services server computer systems 202 identifies other end users at 948 for comparison purposes.

Preferably, the identification of other end users is limited to active end users, rather than end users who have dropped out or who do not actively participate at a high enough frequency. Active end users tend to provide information that is more representative of the class of end users who are being targeted than inactive end users.

Preferably, the identification of other end users takes into account geographic proximity to the other end users to the end user. Geographically proximate end users may be more representative than geographically distant end users. For instance, end users in a city may have different preferences than end users in a suburb or rural area, or even different from end users in a different city. However, it is also desirable that the size of the sample is sufficiently large that information is not attributable to any specific end user. Thus, it may be necessary to trade off geographical proximity (i.e., a proxy for representativeness) for anonymity.

At 950, the hosted services server computer systems 202 determines whether a sufficient number of active users are in the geographic area. Again, it is desirable that information is not attributable to specific active end users, thus it may be desirable to increase a size of a geographic area from which end users are drawn to increase the anonymity of the information. Additionally, sample sizes that are too small are statistically meaningless or uninformative. If the number of active users is not sufficiently large to ensure either anonymity and/or statistical significance, the hosted services server computer systems 202 increases the geographic area at 952. The method returns control to 952, successively increasing a geographic area until a sufficiently wide geographic area has been reached or optionally a defined limit reached (e.g., 100 km radius). At 954 the hosted services server computer systems 202 generates comparative information based only on active users in the original or newly expanded geographic area. At 956, the hosted services server computer systems 202 causes presentation of the comparative information to the user. The method 900C ends at 946, for example until called again by a calling routine.

Figure 10:
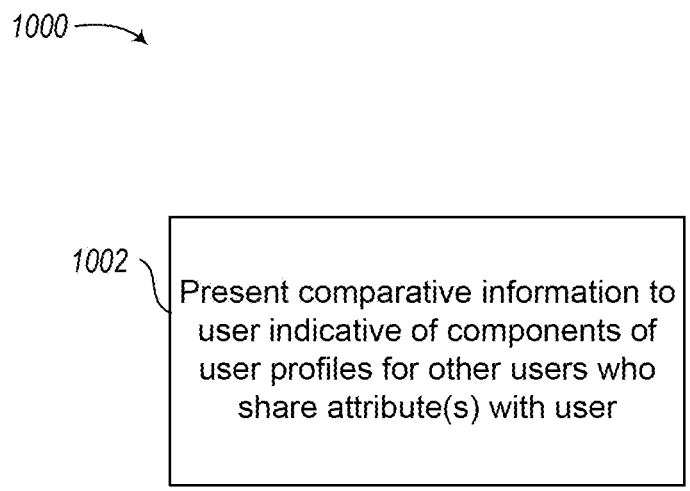

FIG. 10 shows a method 1000 of operating a hosted services server computer systems 202, according to one illustrated embodiment. The method 1000 may be employed in executing any of acts 412 (FIG. 4), 510 (FIG. 5), 610 (FIG. 6), 710 (FIG. 7), and 808 (FIG. 8).

At 1006, the hosted services server computer systems 202 causes comparative information to be presented to the user, and the comparative information is indicative of components of user profiles for other ones of the users who share at least one attribute with the user.

Figure 11:
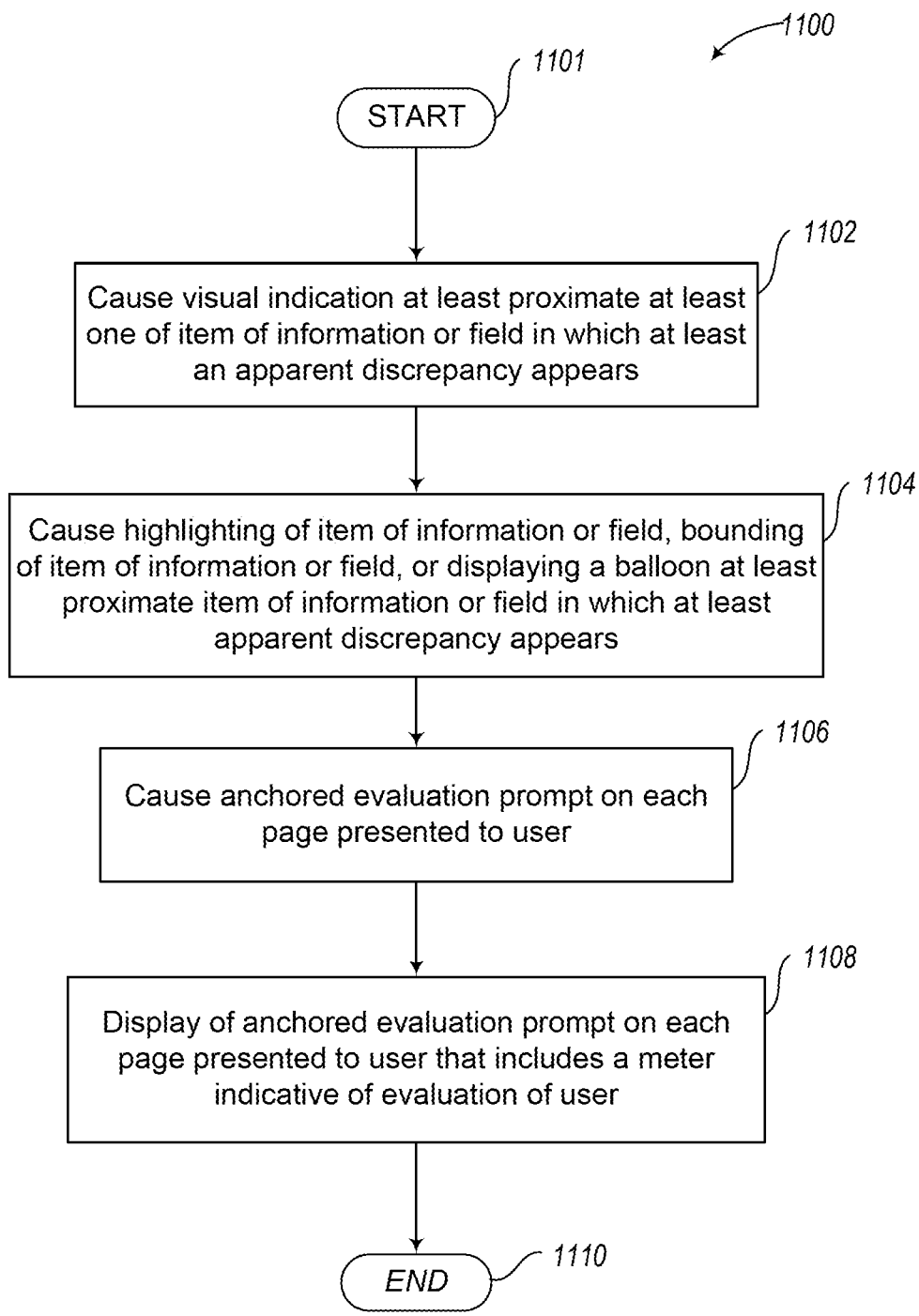

FIG. 11 shows a method 1100 of operating a hosted services server computer systems 202, according to one illustrated embodiment. The method 1100 may be employed in executing any of acts 412 (FIG. 4), 510 (FIG. 5), 610 (FIG. 6), 710 (FIG. 7), and 808 (FIG. 8).

The method 1100 starts at 1101, for example in response to a call from a calling routine. At 1102, the hosted services server computer systems 202 causes a visual indication to be displayed at least proximate at least one of an item of information or a field in which at least an apparent discrepancy appears. The visual indication may take any of a large variety of forms. Such may include icons (user selectable or not), text, numbers and/or symbols, different colors, fonts, and/or sizes.

At 1104, the hosted services server computer systems 202 causes visual indication in the form of a highlighting of an item of information or a field, a bounding of an item of information or a field, or displaying a balloon at least proximate at least one of an item of information or a field in which at least an apparent discrepancy appears. Such may take any of a large variety forms that provide visual emphasis. For instance, highlighting may include standard use of a different color, or a blinking or flashing affect, Bounding may include providing a marquee type affect. A balloon may include a lead line to the relevant item of information.

At 1106, the hosted services server computer systems 202 causes an anchored evaluation prompt to be displayed on each of a plurality of pages presented to the user. The anchored evaluation prompt may be indicative of a respective evaluation of the user. An anchored evaluation prompt is a prompt that is anchored to a position or location across multiple pages. Anchoring makes the evaluation easy to find across the pages. At 1108, the hosted services server computer systems 202 causes an anchored evaluation prompt to be displayed on each of a plurality of pages presented to the user. In some implementations, the anchored evaluation prompt may take the form of a dashboard or other widget. The dashboard may include a meter that is displayed on the plurality of pages presented to the user. The meter may be indicative of the respective evaluation of the user. For example, the meter may represent an overall evaluation score of the end user, for instance with respect to other end users. The method 1100 ends at 1110.

Figure 12:
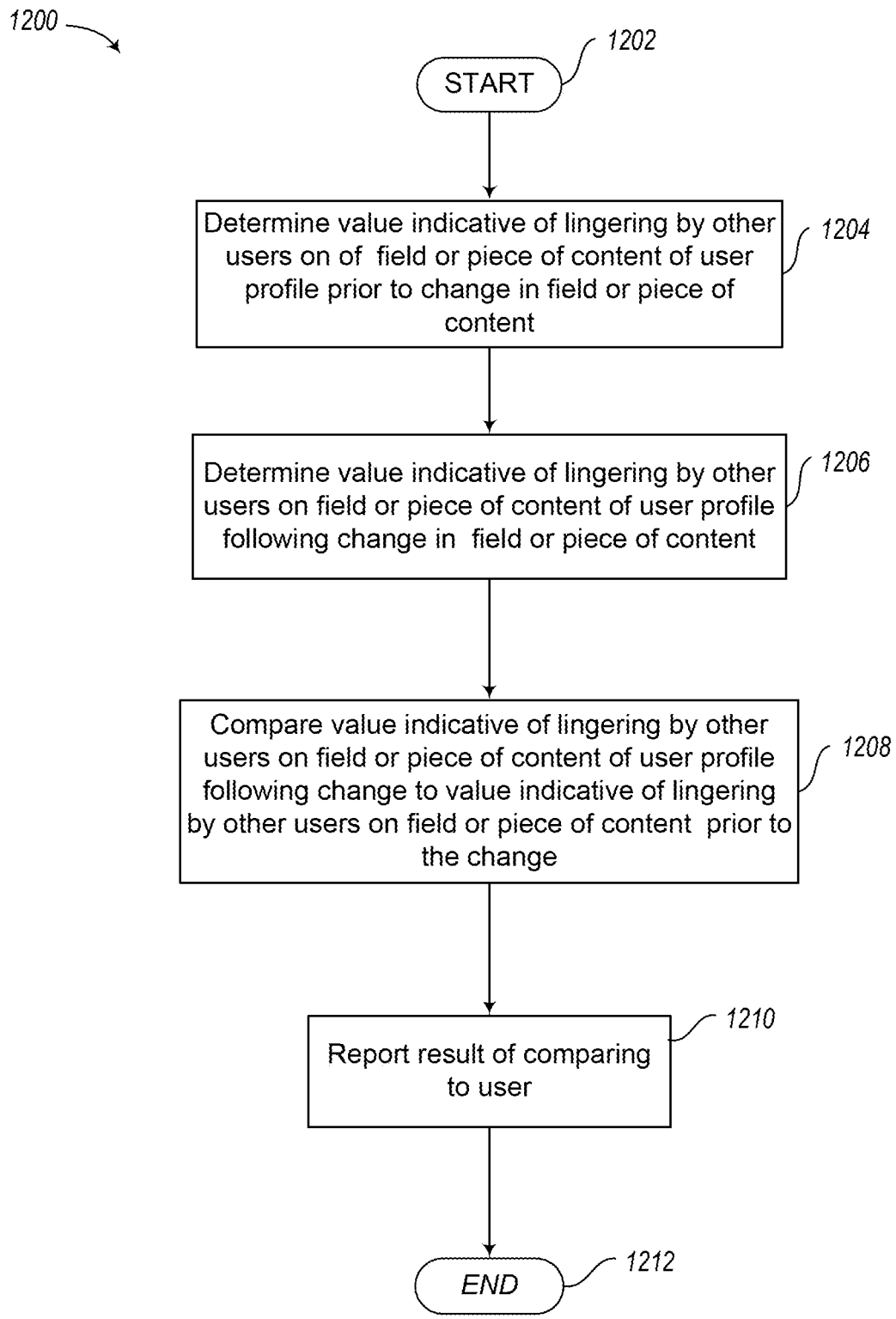

FIG. 12 shows a method 1200 of operating the hosted services server computer systems 202, according to one illustrated embodiment. Such may be used to assess how effective an end user profile or image is at attracting other end users, particularly before and after a change to such.

The method 1200 starts at 1202, for example in response to a call from a calling routine. At 1204, the hosted services server computer systems 202 determines at least one value indicative of an occurrence and/or amount of time of lingering by other users on at least one of a field or a piece of content of the respective user profile of the user prior to a change in the at least one of the field or the piece of content of the respective user profile of the user. At 1206, the hosted services server computer systems 202 determines at least one value indicative of an occurrence and/or amount of time of lingering by other users on at least one of a field or a piece of content of the respective user profile of the user following the change in the at least one of the field or the piece of content of the respective user profile of the user. The value(s) may be indicative of the number of times other end users linger, for example for a period exceeding some minimum threshold (e.g., 10 seconds). The value(s) may be indicative of an amount of time other end users linger. Such may be on an end user by other end user basis, or may be some type cumulative value, for instance an average or median value.

At 1208, the hosted services server computer systems 202 compares the value(s) indicative of lingering by other users following the change to the value(s) indicative of lingering by other users prior to the change. Again, such may be indicative of the effectiveness of the change(s) in attracting the attention of other end users. At 1210, the hosted services server computer systems 202 reports a result of the comparing to the user, and then ends at 1212.

Figure 13:
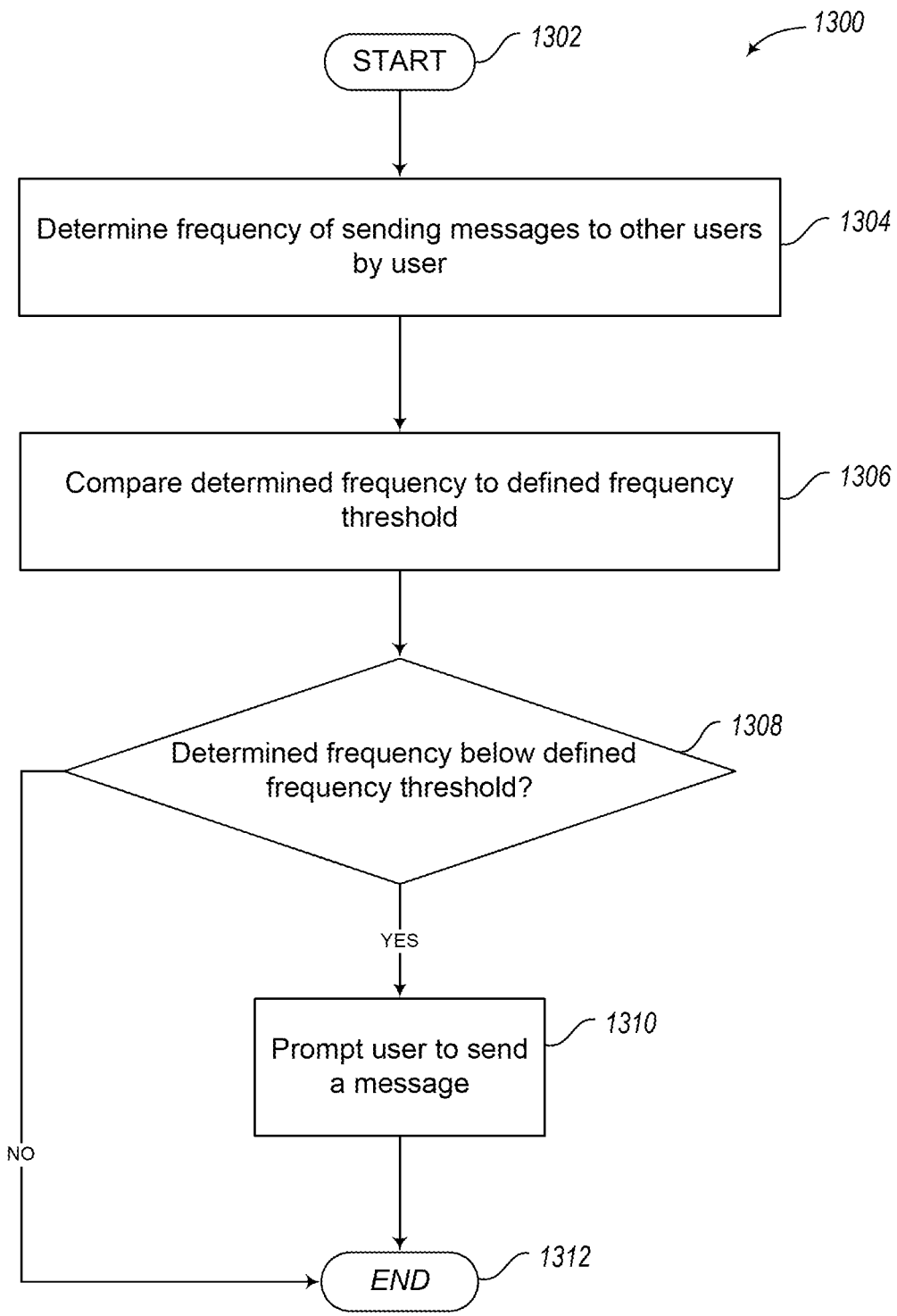

FIG. 13 shows a method 1300 of operating the hosted services server computer systems 202, according to one embodiment. The method 1300 may be effective a determining whether an end user is attempting to contact other end users at a suitable rate.

The method 1300 starts at 1302, for example in response to a call by a calling routine. At 1304, the hosted services server computer systems 202 determines a frequency of sending messages to other users by the user. At 1306, the hosted services server computer systems 202 compares the determined frequency so a defined lower frequency threshold. At 1308, the hosted services server computer systems 202 determine whether the frequency is below the defined lower frequency threshold. If the frequency is below the defined lower frequency threshold, the hosted services server computer systems 202 prompts the user, or causes the user to be prompted, to send more messages (e.g., attempted contacts of other end users). While not illustrated, the hosted services server computer systems 202 may also compare the determined frequency to a defined upper frequency threshold, prompting end users who are above the defined upper frequency threshold. Such may identify end users who send so many requests for contact as to be considered pests or overly aggressive. The method 1300 ends at 1312.

Figure 14:
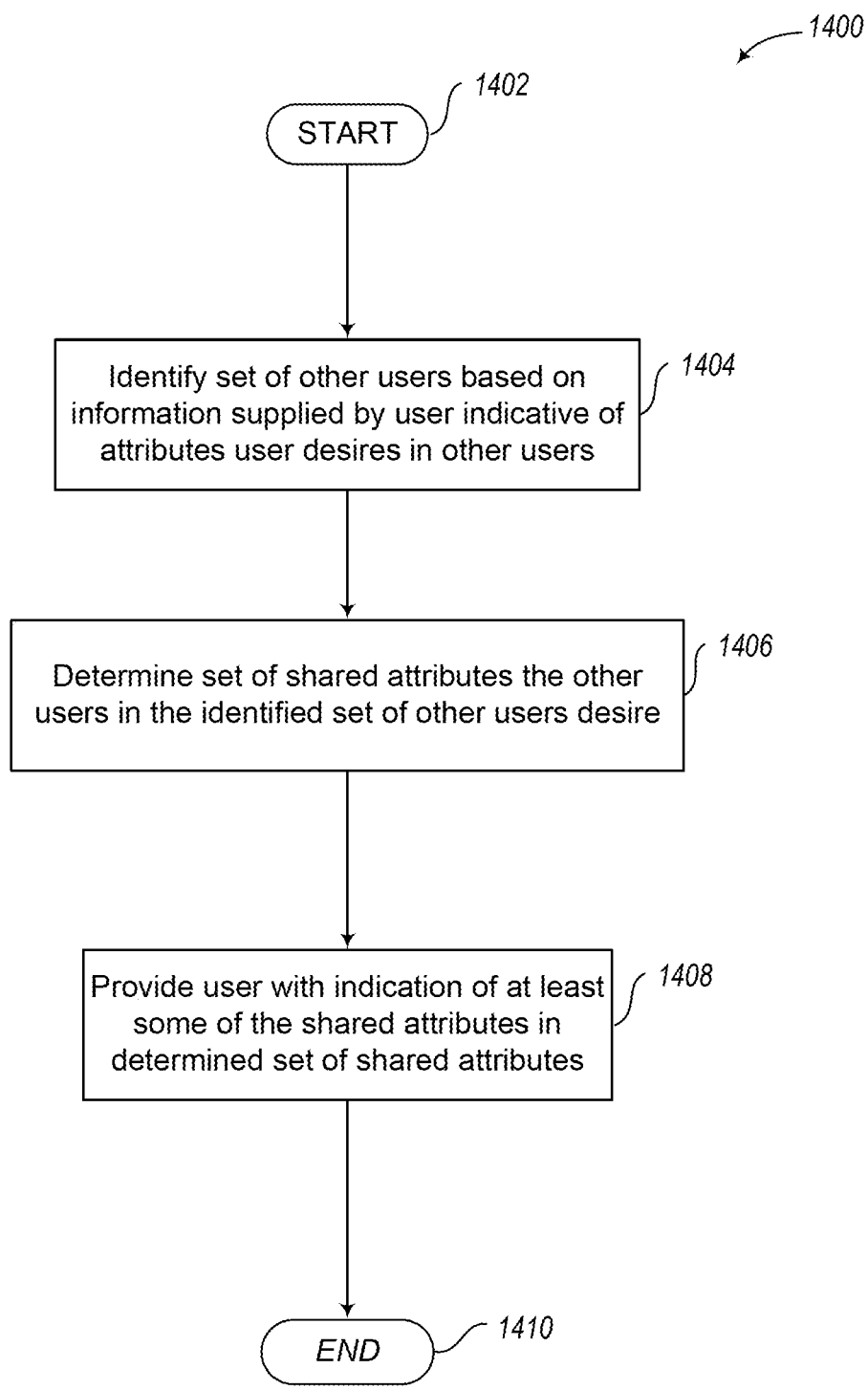

FIG. 14 shows a method 1400 of operating the hosted services server computer systems 202, according to one embodiment. The method 1400 may be used to provide feedback to an end user that helps the end user understand what those the end user is targeting desired. Thus, if an end user is targeting other end users with a first set of traits or attributes, it would be useful for that end user to know what those targeted end users desire in a potential candidate or match. Such may help guide the end user in developing their own end user profile and actions or activities to be more attractive or appealing to those the end user is targeting.

The method 1400 starts at 1402, for example in response to a call by a calling routine. At 1404, the hosted services server computer systems 202 identifies a set of other users based on information supplied by the user. The information supplied by the user may be indicative of attributes the end user desires in other end users. Such may include various demographic attributes or traits, for instance height, weight, age, income, education level, type of relationship, interests, hobbies, etc. At 1406, the hosted services server computer systems 202 determines a set of shared attributes the other end users in the identified set of other end users desire. In other words, what is it that these other end users are looking for or desire in seeking a relationship. At 1408, the hosted services server computer systems 202 provides the original end user with an indication of at least some of the shared attributes in the determined set of shared attributes.

Figure 15:
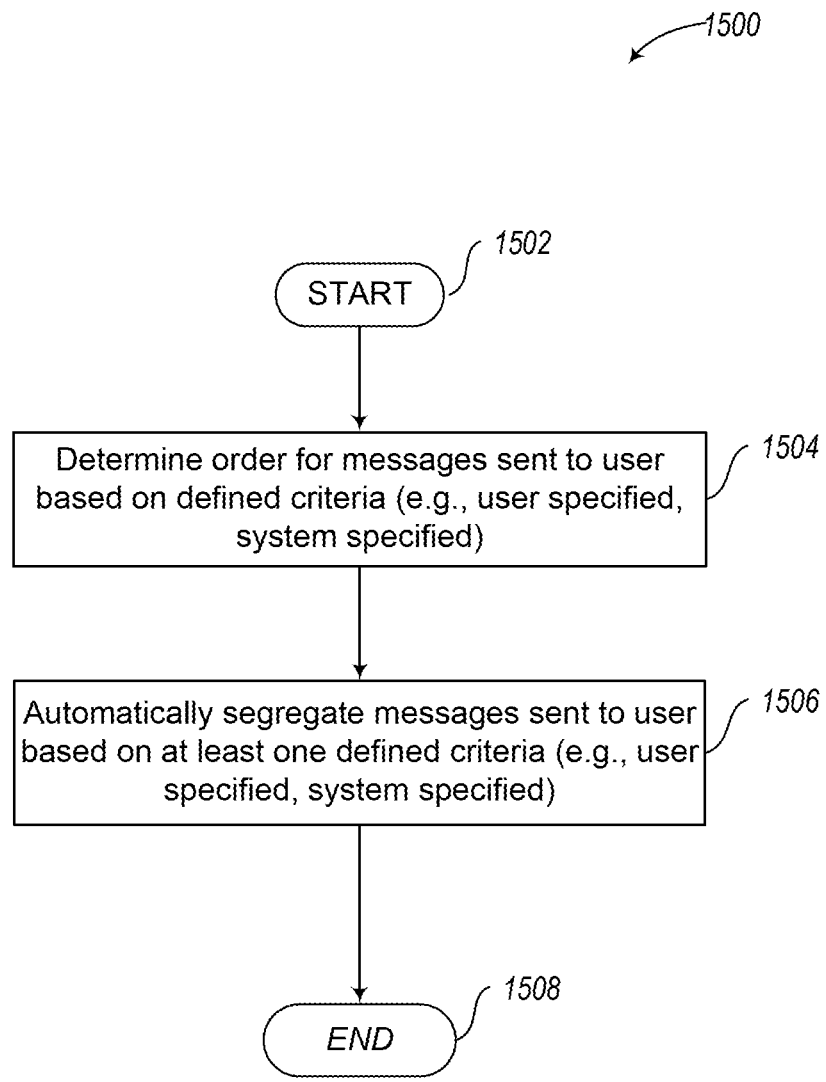

FIG. 15 shows a method 1500, according to one illustrated embodiment. The method 1500 may be employed in or more of the other methods. In particular, many end users may receive numerous messages or attempts to contact from other end users. End user with particularly desirable traits or attributes as represented in their respective end user profiles, images, etc. may be overwhelmed with these messages. The method 1500 addresses such a problem.

The method 1500 starts at 1502, for example in response to a call by a calling routine.

At 1504, the hosted services server computer systems 202 determines a relative order for a plurality of messages sent to an end user by various other end users. In determining the relative order, the hosted services server computer systems 202 may use one or more user specified criteria and/or one or more system specified criteria. For example, in determining the relative order, the hosted services server computer systems 202 may use an assessment of how well a send end user matches with the recipient end user. Such assessment may be based on the various attributes specified in the respective end user profiles, with or without system specified attributes or criteria. The assessment may employ various algorithms, for example algorithms specified in the applicant's other patent applications, which are incorporated herein by reference. Other end users who are deemed better matches or potential candidates may be ranked higher than other end users. It is noted that many of these algorithms do not necessarily equate exact matches with being a best match or potential candidates. In fact, some differences tend to be desirable in relationships of various types (e.g., personal, business). Thus, the algorithm may introduce this looseness in matching or one or more system specified criteria may introduce such. The ranking may be a ranking across a continuous spectrum, or may be segmented into groups (e.g., high, middle, low).

At 1506, the hosted services server computer systems 202 automatically segregates a number of messages sent to the end user based at least in part on the determined order which was based on at least one defined criteria. For example, a plurality of messages in an inbox or field in a window may be ordered sequentially according to the determined order. For instance, message from those considered to be best matches or best potential candidates may appear first, followed by messages from lower ranked potential candidates. This is in contrast to typically electronic message systems which may order messages by date received, date sent, sender, recipient or subject fields.

The method 1500 then ends at 1510.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent application Ser. No. 14/204,939, filed Mar. 11, 2014; U.S. Provisional Patent Application No. 61/780,391, filed Mar. 13, 2013; U.S. Provisional Patent Application No. 61/691,082, filed Aug. 20, 2012; U.S. Patent Publication No. 2010/0262611, published Oct. 14, 2010; and U.S. Provisional Patent Application No. 61/756,912, filed Jan. 25, 2013, are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of operating a processor-based hosted-services system to provide services to a plurality of remotely located users via user-operated processor-based devices over network infrastructures, the method comprising:

identifying, by at least one processor of the processor-based hosted-services system, a subset of the system's users as successful users based at least in part on one or more defined success-evaluation criteria, wherein the success-evaluation criteria including at least 1) a defined number or rate of positive interactions with other users and 2) a minimum length of time that another user lingers on a piece of content in a user's profile;

reviewing, by at least one processor of the processor-based hosted services system, components of the successful users' profiles to generate a set of defined evaluation criteria;

for a target user who is not one of the successful users, comparing his or her respective user profile to the set of defined evaluation criteria;

detecting at least one discrepancy from desired behavior between the components of the target user's user profile and the set of defined evaluation criteria, wherein the at least one discrepancy is the piece of content;

checking, using the hosted services system, for a severity level of the target user's discrepancy from desired behavior;

determining whether the user's discrepancy from desired behavior is sufficiently large to cause a prompt to be displayed to the target user on a display of a digital communication device, the prompt including at least one suggestion for correcting the at least one discrepancy that includes modifying the user's messaging behavior that is hindering the user's chances of obtaining a successful relationship, wherein the at least one suggestion is changing the piece of content;

determining a first value indicative of the minimum length of time that the another user lingers on the piece of content in the user's profile; and determining a second value indicative of the minimum length of time that the another user lingers on the piece of content in the user's profile following a change in the piece of content in the user's profile, wherein a difference between the first value and the second value is indicative of an effectiveness of the change in the piece of content in attracting attention of the another user.

2. The method of claim 1, further comprising:
determining at least one value that characterizes at least one action taken by the target user;
comparing the determined at least one value to a defined evaluation-criteria value for the successful users;
determining whether a discrepancy exists between the determined at least one value and the defined evaluation criteria value for the successful users; and
in response to determining that a discrepancy exists, prompting the user with at least an indication of the existence of the discrepancy.

3. The method of claim 1, wherein the comparing step is responsive to a request received from the target user.

4. The method of claim 1, wherein the comparing step is automatically performed in response to an updating of the user profile by the target user.

5. The method of claim 1, wherein the comparing step is automatically performed on a periodic basis, independent of any requests received from the target user or any updating of the user profile by the target user.

6. The method of claim 1, wherein the comparing step includes:
determining how recently the target user profile was updated;
comparing a recentness of the update or addition of the target user profile to a defined evaluation recentness; and identifying a discrepancy between the recentness of the update of the target user profile and the defined evaluation recentness.

7. The method of claim 1, wherein causing the prompt to be provided to the target user includes causing comparative information to be presented to the target user, the comparative information indicative of components of user profiles for other ones of the users who share at least one attribute with the user.

8. The method of claim 7, wherein causing the prompt to be provided to the target user includes causing presentation of comparative information to the target user, the comparative information representative of at least a defined minimum number of other ones of users.

9. The method of claim 8, further comprising limiting the other ones of users to other ones of users in a certain geographic area.

10. The method of claim 7, wherein causing the prompt to be provided to the target user includes causing information that compares a total number of images of the target user to a total number of images for a set of other ones of the users who share common demographic information with the user.

11. The method of claim 7, wherein causing the prompt to be provided to the target user includes causing information that compares how often the target user updates images of the user to how often a set of other ones of the users who share common demographic information with the user update respective images.

12. The method of claim 9, further comprising, in response to an insufficient number of other ones of users being available within the certain geographic area, generating the comparative information based on other ones of the users from a wider geographic area than the certain geographic area, to achieve at least the defined minimum number of other ones of the users.

13. A processor-based hosted services system to provide services to a plurality of remotely located users via user operated processor-based devices over network infrastructures, the processor-based hosted services system comprising:
a number of communications ports which provide communications with a plurality of end user devices, the end user devices logically associable with a plurality of user client accounts of the processor-based hosted services, the user client accounts logically associable with user clients of the processor-based hosted service;
at least one nontransitory processor-readable medium that stores at least one of processor executable instructions or data; and
at least one processor communicatively coupled to the communications ports and the at least one nontransitory processor-readable medium, and that:
identifies, by at least one processor of the processor-based hosted-services system, a subset of the system's users as successful users based at least in part on one or more defined success-evaluation criteria, wherein the success-evaluation criteria including at least 1) a defined number or rate of positive interactions with other users and 2) a minimum length of time that another user lingers on a piece of content in a user's profile;
reviews, by at least one processor of the processor-based hosted services system, components of the successful users' profiles to generate a set of defined evaluation criteria;
for a target user who is not one of the successful users, compares his or her respective user profile to the set of defined evaluation criteria;

detecting at least one discrepancy from desired behavior between the components of the target user's user profile and the set of defined evaluation criteria, wherein the at least one discrepancy is the piece of content;

checking, using the hosted services system, for a severity level of the target user's discrepancy from desired behavior; and determining whether the user's discrepancy from desired behavior is sufficiently large to cause a prompt to be displayed to the target user on a display of a digital communication device, the prompt including at least one suggestion for correcting the at least one discrepancy that includes modifying the user's messaging behavior that is hindering the user's chances of obtaining a successful relationship, wherein the at least one suggestion is changing the piece of content;

determining a first value indicative of the minimum length of time that the another user lingers on the piece of content in the user's profile; and determining a second value indicative of the minimum length of time that the another user lingers on the piece of content in the user's profile following a change in the piece of content in the user's profile, wherein a difference between the first value and the second value is indicative of an effectiveness of the change in the piece of content in attracting attention of the another user.

14. The processor-based hosted services system of claim 13, wherein the at least one processor further:

determines at least one value that characterizes at least one action taken by the target user;

compares the determined at least one value to a defined evaluation-criteria value for the successful users;

determines whether a discrepancy exists between the determined at least one value and the defined evaluation criteria value for the successful users; and in response to determining that a discrepancy exists, prompts the user with at least an indication of the existence of the discrepancy.

15. The processor-based hosted services system of claim 13, wherein the at least one processor compares the number of components in response to a request received from the target user.

16. The processor-based hosted services system of claim 13, wherein the at least one processor automatically compares the number of components in response to an updating of the user profile by the target user.

17. The processor-based hosted services system of claim 13, wherein the at least one processor automatically compares the number of components on a periodic basis, independent of any requests received from the target user or any updating of the user profile by the target user.

18. The processor-based hosted services system of claim 13, wherein the at least one processor further:

determines how recently the target user profile was updated; and compares a recentness of the update or addition of the target user profile to a defined evaluation recentness; and identifies a discrepancy between the recentness of the update of the target user profile and the defined evaluation recentness.

19. The processor-based hosted services system of claim 13, wherein the at least one processor further:

determines how frequently the target user profile is updated; and compares the determined frequency of the updating of the target user profile to a defined evaluation frequency; and identifies a discrepancy between the frequency of the updating of the target user profile and the defined evaluation frequency.

20. The processor-based hosted services system of claim 13, wherein the at least one processor further:

determines how recently an image of the user was updated or added to the target user profile; and compares a recentness of the image update or addition with a defined evaluation recentness; and identifies a discrepancy between the recentness of the image update or addition and the defined evaluation recentness.

21. The processor-based hosted services system of claim 13, wherein the at least one processor further:

determines a length of a profile description, and identifies a discrepancy between the determined length of the profile description and a defined evaluation minimum profile description length or a defined evaluation maximum profile description length.

\* \* \* \* \*